(12) United States Patent
Jin et al.

(10) Patent No.: US 9,363,644 B2
(45) Date of Patent: Jun. 7, 2016

(54) SYSTEM AND METHOD FOR DETECTION OF INDOOR TRACKING UNITS

(71) Applicant: YAHOO! INC., Sunnyvale, CA (US)

(72) Inventors: Haojian Jin, Santa Clara, CA (US); Christian Holz, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 114 days.

(21) Appl. No.: 14/462,756

(22) Filed: Aug. 19, 2014

(65) Prior Publication Data

US 2016/0021511 A1 Jan. 21, 2016

Related U.S. Application Data

(63) Continuation-in-part of application No. 14/333,056, filed on Jul. 16, 2014.

(51) Int. Cl.
| | |
|---|---|
| H04W 24/00 | (2009.01) |
| H04W 4/04 | (2009.01) |
| H04W 4/00 | (2009.01) |
| H04W 4/02 | (2009.01) |
| H04W 84/18 | (2009.01) |
| G01C 21/20 | (2006.01) |

(52) U.S. Cl.
CPC ............... *H04W 4/04* (2013.01); *H04W 4/008* (2013.01); *H04W 4/021* (2013.01); *H04W 84/18* (2013.01); *G01C 21/206* (2013.01)

(58) Field of Classification Search
CPC ....... H04W 88/06; H04W 4/008; H04W 4/04; H04W 4/021; H04W 84/18; H04W 24/00; H04W 4/025; H04W 4/028; H04W 64/00; H04W 64/006; H04W 4/043; H04W 4/206; G01C 21/206

USPC .............. 455/41.2, 456.1–457, 566; 701/409, 701/420, 422, 450, 454, 457
See application file for complete search history.

(56) References Cited

U.S. PATENT DOCUMENTS

| | | | |
|---|---|---|---|
| 8,145,255 B2 | 3/2012 | Rekimoto | |
| 8,320,939 B1* | 11/2012 | Vincent | ................... G01S 19/48 370/338 |
| 8,965,398 B2* | 2/2015 | Zhu | ................................ 370/338 |
| 2007/0271011 A1* | 11/2007 | Lee | ....................... G05D 1/0242 700/245 |

(Continued)

OTHER PUBLICATIONS

Written Opinion of the International Searching Authority (PCT/US2015/040384) dated Oct. 19, 2015.

*Primary Examiner* — Olumide T Ajibade Akonai
(74) *Attorney, Agent, or Firm* — James J. DeCarlo; Greenberg Traurig, LLP

(57) ABSTRACT

Disclosed is a system and method for obtaining ad-hoc the spatial layout and setup of installed radio-based indoor tracking systems at particular locations. The systems and methods can be implemented via an installed or web-based application that performs the ad-hoc detection of indoor beacons, which includes detecting the signal strength of all beacons at a location while the user performs a previously configured gesture. From the trajectory of the gesture and the recorded signal strengths, the disclosed systems and methods derive the distance and direction of all beacons, which are laid out in a 2D map. Thus, the present disclosure can implicitly calibrate signal strengths to high-accuracy distances, thereby producing the spatially accurate 2D setup of the previously unknown space, in addition to indoor tracking on a decimeter level, which is efficient and increasingly cost effective for device tracking and advertising purposes.

20 Claims, 17 Drawing Sheets

(56) References Cited

U.S. PATENT DOCUMENTS

| | | |
|---|---|---|
| 2008/0304361 A1 | 12/2008 | Peng et al. |
| 2009/0233551 A1 | 9/2009 | Haartsen et al. |
| 2013/0260693 A1 | 10/2013 | Un et al. |
| 2014/0113558 A1 | 4/2014 | Varoglu et al. |
| 2014/0148196 A1* | 5/2014 | Bassan-Eskenazi .... G01S 11/02 455/456.1 |
| 2014/0243015 A1* | 8/2014 | Basha .................. G01S 5/0284 455/456.1 |
| 2014/0278060 A1* | 9/2014 | Kordari ................ G01C 21/206 701/422 |
| 2014/0365127 A1* | 12/2014 | Poduri .................. G01C 21/00 701/537 |
| 2015/0242899 A1* | 8/2015 | Farhi .................. G06Q 30/0261 705/14.58 |
| 2016/0014553 A1* | 1/2016 | Cardinal ............... H04W 64/00 455/456.3 |

* cited by examiner

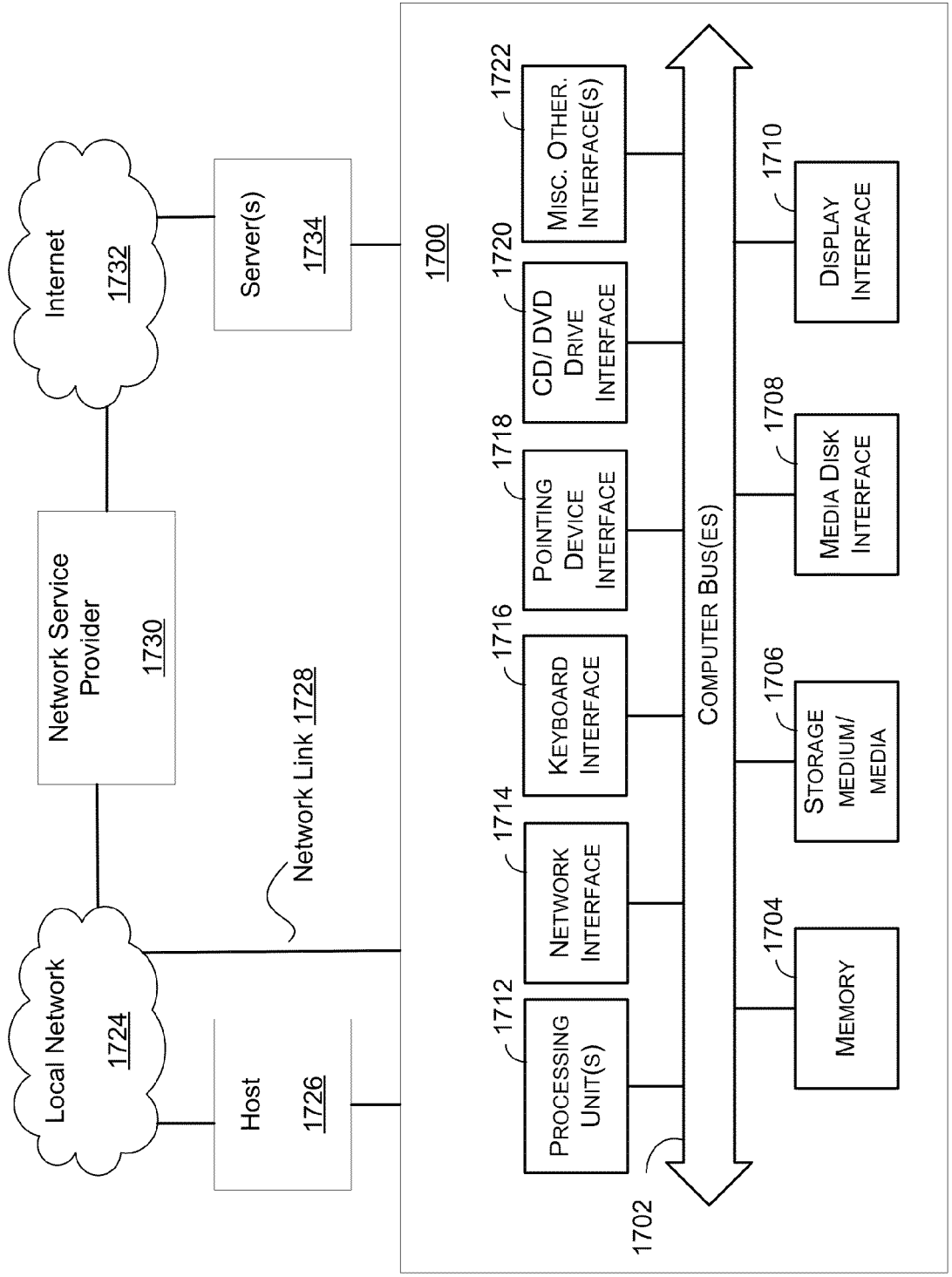

SYSTEM AND METHOD FOR DETECTION OF INDOOR TRACKING UNITS

CROSS REFERENCE TO RELATED APPLICATIONS

This application is a continuation-in-part and claims priority to U.S. application Ser. No. 14/333,056, filed on Jul. 16, 2014, entitled "System and Method for Calibrating Bluetooth Low Energy Signal Strengths," which is incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to mapping indoor locations, and more particularly towards systems and methods for obtaining a spatial layout of a radio-based indoor tracking system.

BACKGROUND

Radio units, implementing Bluetooth low energy (BLE) technology, are reemerging as the de facto standard for robust indoor tracking systems. Such radio units, which can also be referred to as BLE units, can be coin-sized, light-weight devices that can be easily attached to any surface, including, for example: walls, tables, products, and the like. BLE technology is increasingly being used in radio units in commercial situations, for example, to augment shopping trips in malls and airports by offering relevant suggestions or coupons, or to support experiences in stadiums during sports events. Thus, indoor tracking has several advantages for commercial situations, such as offering coupons when users shop in malls and airports, or providing relevant suggestions to support user experiences in stadiums and sporting events.

SUMMARY

The present disclosure describes systems and methods for obtaining the spatial layout setup of installed radio units at particular locations. Conventional tracking systems require a static determination of a location's layout prior to use. That is, current indoor tracking systems operate on known 2-dimensional (2D) set ups, which are established prior to use. There is currently no known system or method that dynamically establishes the 2D setup of BLE units ad-hoc. The presently disclosed systems and methods obtain the layout of a radio-based indoor tracking system of an unknown space or location in real-time (or near-real time). The disclosed systems and methods operate ad-hoc, in that there is no requirement for communication between a device and installed beacons at the location. Specifically, the disclosed systems and methods do not require authentication, an established connection, or exchange of data with installed beacons, BLE units or networks, as is required by conventional systems and techniques.

The disclosed systems and methods can be implemented via an installed or web-based application that performs the ad-hoc detection of indoor signals associated with BLE units. The disclosed detection includes detecting the signal strength of all detectable beacons at a location while the user performs a previously configured gesture. For example, as discussed in more detail below, the gesture can generally be a 360 rotation. According to some embodiments, the gesture can be a half-rotation or some other portion of a rotation or movement that registers a trajectory, as discussed herein. From the trajectory of the gesture and the recorded signal strengths detected during gesture performance, the disclosed systems and methods derive the distance and direction of all beacons to a user's device, which are spatially laid out in a 2D map. Thus, the present disclosure can calibrate signal strengths to a relatively high-accuracy. This not only facilitates the production of a spatially accurate 2D setup of the previously unknown space, but also can provide indoor tracking on a decimeter level (or lower), which is efficient and increasingly cost effective for device tracking and advertising purposes. As discussed in more detail below, the performance of the disclosed indoor tracking can be based upon, but not limited to, speed/velocity of the performed gesture, number of beacons present at the location or within range of the gesture, interference, and other conditions at or impacting the location, and the like. Thus, the disclosed systems and methods enable the construction of a signal-strength to distance map having an absolute orientation that can then be constructed for reuse on any device with a Bluetooth™ component.

In accordance with one or more embodiments, a method is disclosed which includes monitoring, via a computing device, a location for signals associated with at least one Bluetooth low energy (BLE) unit, said monitoring occurring during performance of a preconfigured gesture that changes the position of the computing device during the performance of the gesture, said location comprising an unknown number of BLE units and BLE unit positions at said location; detecting, via the computing device and during performance of the gesture, a signal from a first BLE unit, said detection occurring ad-hoc without exchanging information with said BLE unit; based on said detection, determining, via the computing device, signal information associated with said signal; calculating, via the computing device, a distance to and direction of said first BLE unit respective to the computing device based on said signal information; and visibly displaying, on a display associated with said computing device, a spatial map of said location, said spatial map comprising an indication of a position of the first BLE unit based on the calculated distance and direction.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for obtaining a layout of a radio-based indoor tracking system.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 17 is a block diagram illustrating architecture of a hardware device in accordance with one or more embodiments of the present disclosure.

DESCRIPTION OF EMBODIMENTS

Figure 1:
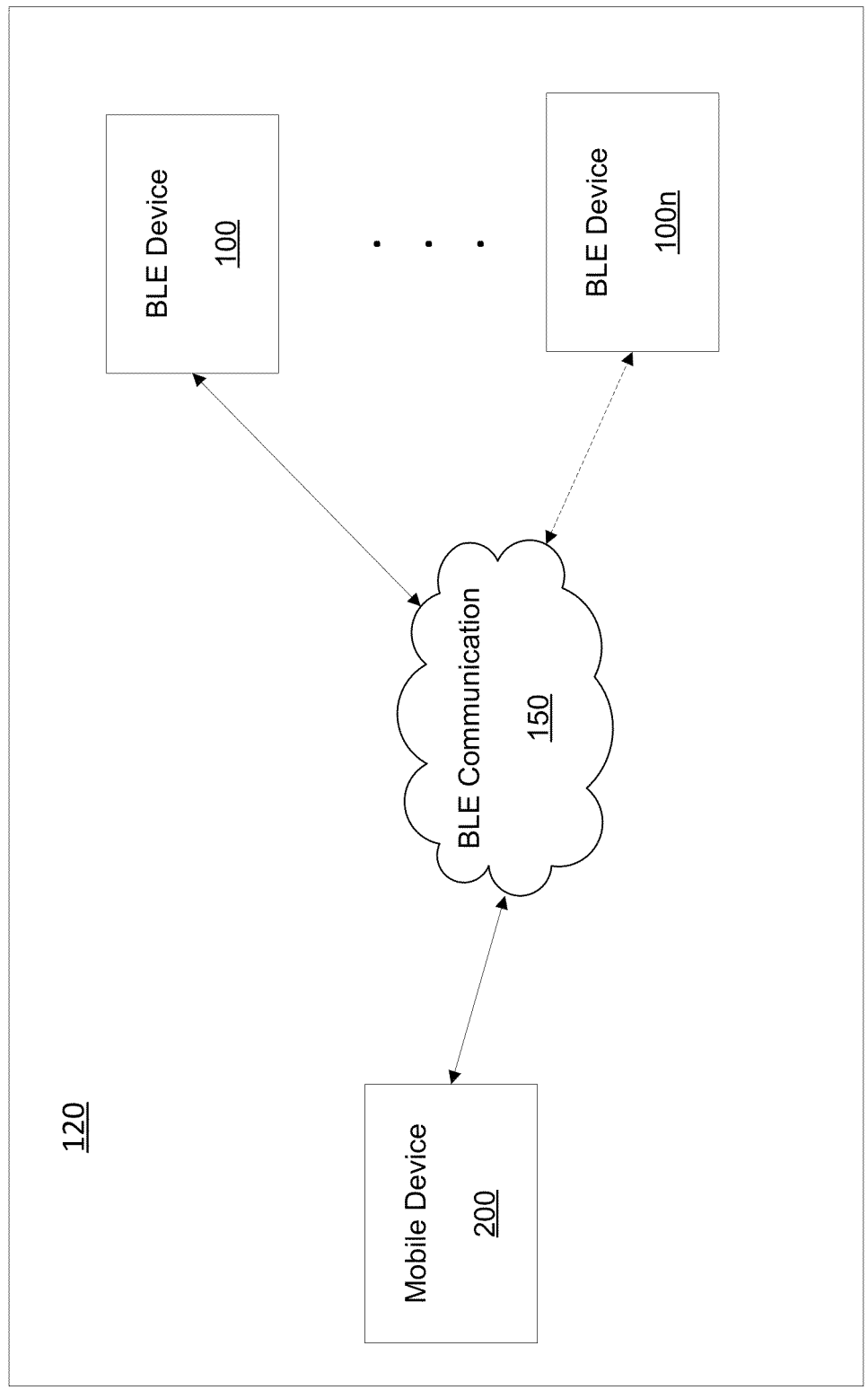
FIG. 1 is a schematic diagram illustrating an example of BLE communication system according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, Bluetooth Low Energy Technology (BLE) as a function of the Bluetooth Core Specification Version 4.0 of Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, Bluetooth™ technology enables short-range wireless communication, rather than having to use cables to connect devices to each other. That is, for example, when Bluetooth wireless technology is implemented in a cellular phone or a laptop computer or tablet, such device may be connected to a wireless communication network without having to make a cable connection. All types of digital devices, including smartphones, printers, Personal Digital Assistants (PDAs), desktop computers, mobile devices and terminals, wearable devices, fax machines, keyboards, and joysticks and the like, can be a part of a Bluetooth system. Bluetooth wireless technology can also be used to form an interface between an existing data network and peripheral devices and form a special group between devices which are located far from a fixed network infrastructure. Bluetooth technology provides a robust wireless connection based on quick recognition and by using a frequency hopping method. A Bluetooth module avoids interference with other signals by hopping to a new frequency after the transmission or reception of a packet.

Bluetooth Low Energy (BLE) is a function of the Bluetooth Core Specification Version 4.0 of Bluetooth, which is a short-range wireless communication technology. BLE (also referred to as Bluetooth LE, and marketed as Bluetooth Smart™), is a wireless personal area network technology aimed at novel applications in the healthcare, fitness, security, and home entertainment industries, in addition to smart home and proximity detection services. BLE provides considerably reduced power consumption and cost compared to classic Bluetooth, while maintaining a similar communication range. BLE is natively supported by mobile operating systems, including, for example, iOS, Android, Windows Phone and BlackBerry, as well as OS X, Linux, and Windows 8. BLE involves advantages including, but not limited to, low power requirements, operating for "months or years" on a button cell (i.e., a small single cell battery). As discussed herein, BLE has compatibility with a large installed base of mobile phones, tablets and computers.

Additionally, BLE supports "electronic leash" applications, which are well suited for long battery life, "always-on" devices. As understood by those of skill in the art, an electronic leash is the pairing ("leashing") of one or more wireless devices to a host device that allows the user to find misplaced or out-of-sight objects by activating the host device such that the "leashed" object identifies itself. Thus, BLE, via electronic leashing, can allow a single user-operated device to send communications to a large number of devices or objects.

Thus, based on the above foundational discussion, in addition to the detailed discussion below, the present disclosure describes systems and methods for mapping an unknown space to determine the location of beacons to a mobile device, in addition to the location of each beacon to each other. For purposes of this disclosure, the term beacon, radio unit, BLE device and BLE unit are used interchangeably to refer to a BLE supported device; and, to ensure consistency throughout, the term BLE unit will be used to refer to such devices.

The disclosed systems and methods obtain a 2D spatial setup of installed BLE units (e.g. beacons) at particular locations utilizing a registered absolute orientation. As discussed in more detail below, the disclosed systems and methods obtain the 2D layout ad-hoc, in that there is no requirement for 2-way communication between a device and installed BLE units. The disclosed systems and methods simultaneously derive the direction and distance of installed BLE units solely based on sensor(s) in the user's device. That is, there is no requirement for authentication, connection or exchange of data between a user's device and the BLE units, as the device simply needs to detect signals transmitted by the BLE units to spatially map the distance and direction of the BLE units.

According to some embodiments, systems and methods discussed herein can be implemented via an installed or web-based application that performs the ad-hoc detection of indoor beacons. That is, the systems and methods discussed below can be a product in the form of an application that is downloaded/installed and run on a user's device, a web-based application, or other known or to be known network or cloud based applications that are able to run/execute via a user's device while at a location. Indeed, such applications implementing the present disclosure can be a stand-alone application, or an integrated application that is built-in or correlated with another application (e.g., an application part) for navigation, tracking, or another type of activity that is related to tracking a user's movements or behavior.

Figure 13:
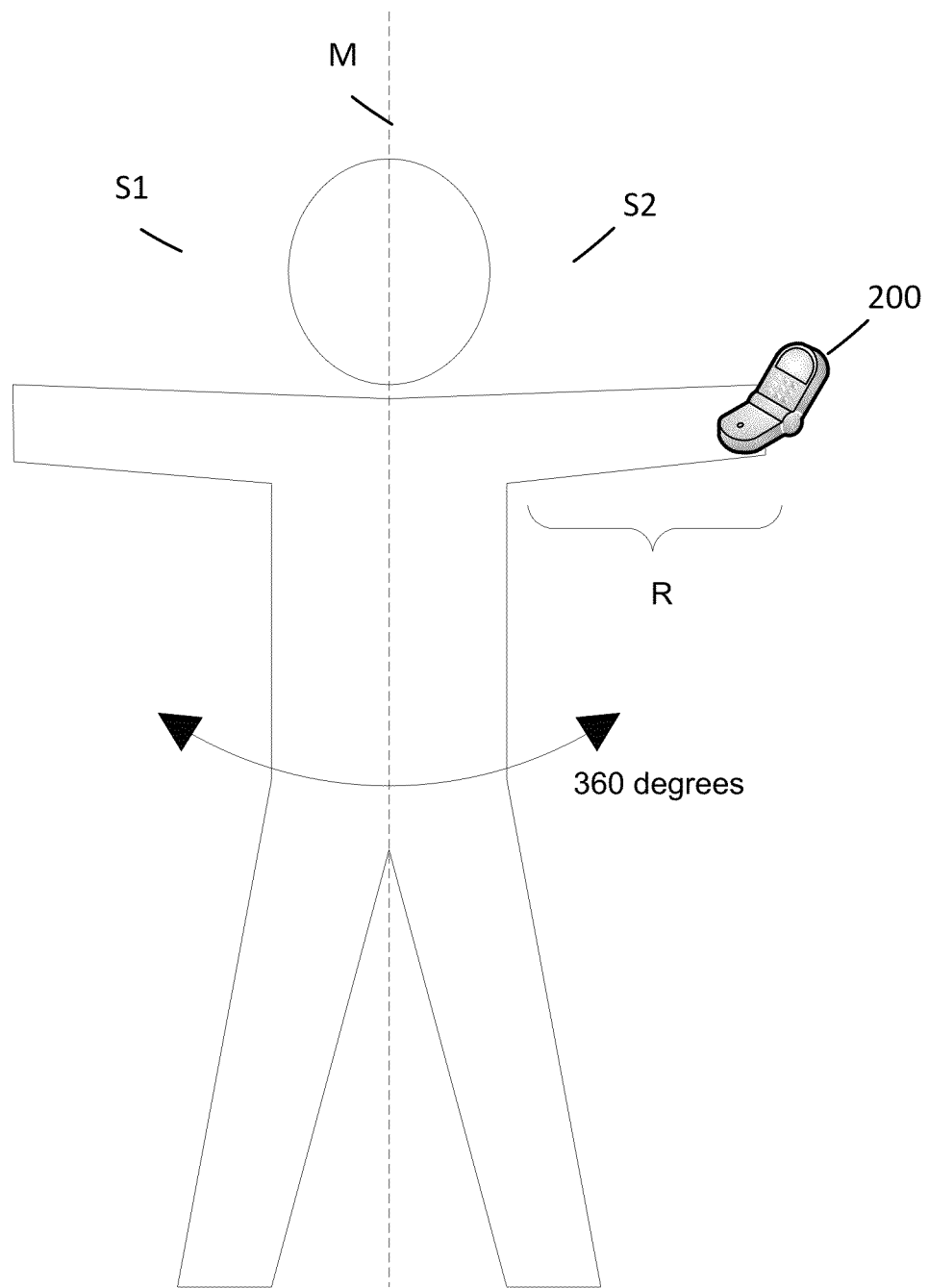
FIG. 13 is a diagram illustrating steps performed in accordance with some embodiments of the present disclosure.
Figure 14:
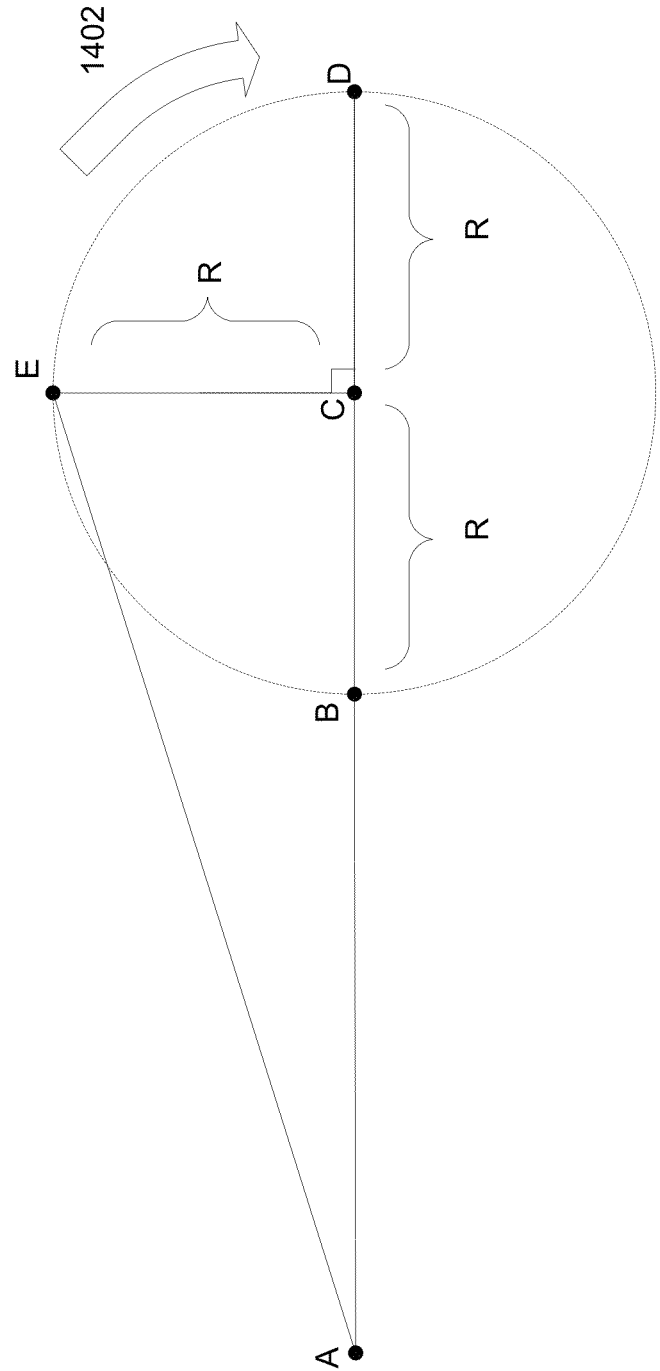
FIG. 14 is a diagram illustrating steps performed in accordance with some embodiments of the present disclosure.
Figure 15:
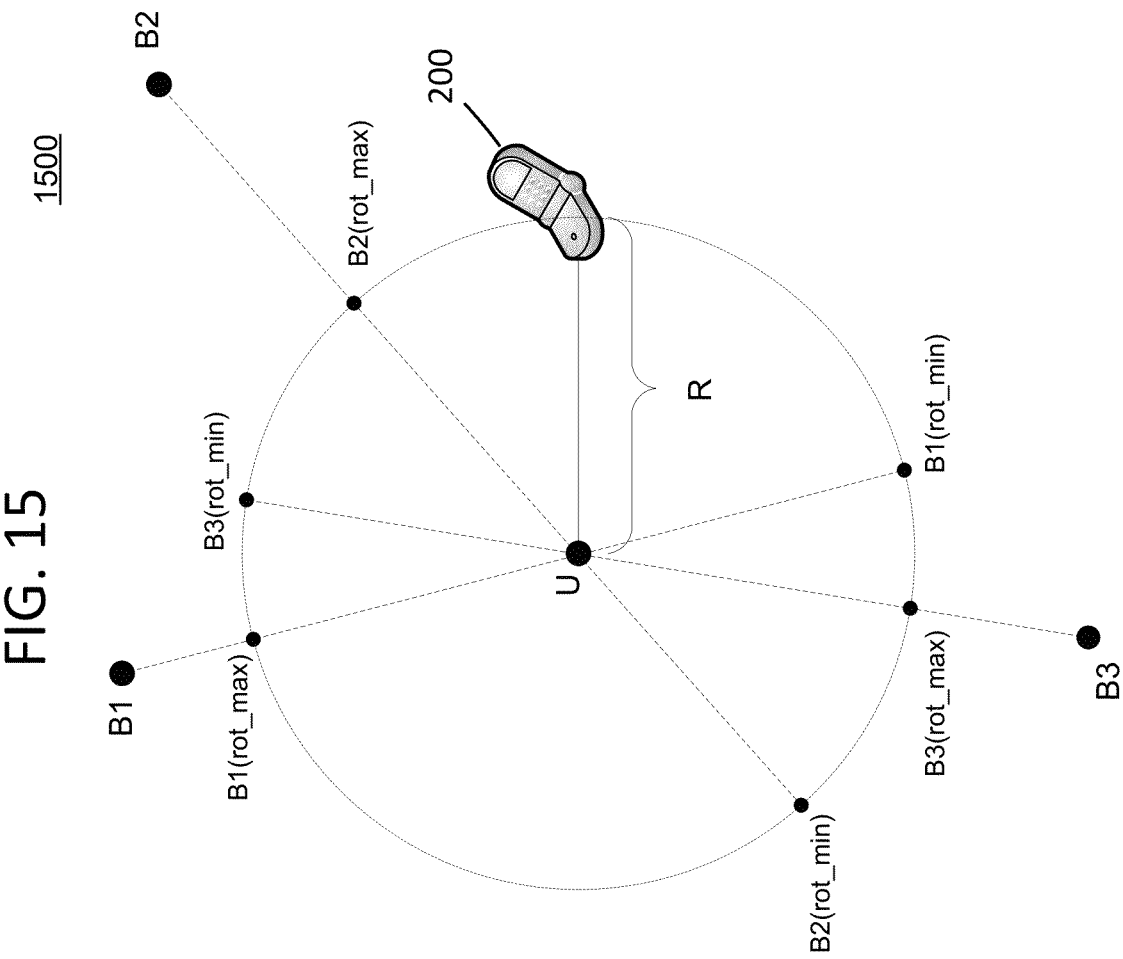
FIG. 15 is a diagram illustrating steps performed in accordance with some embodiments of the present disclosure.

The disclosed detection includes detecting the signal strength of all BLE unit signals at a location (e.g., those that are within range/visible) while the user performs a previously configured gesture. As discussed in more detail below, the gesture can be a movement by a user, such as holding a Bluetooth device at arm's length and rotating in a circle (either clockwise or counter-clockwise), as illustrated in FIGS. 13-15. Thus, this gesture could be regarded as a radial 360 degree movement, where the device is at least at a distance satisfying a radius threshold from center of the user's body. That is, according to some embodiments, the radius required for a gesture's trajectory must at least satisfy a threshold that ensures the gesture will register a spatial difference between the device and a BLE unit at at least two different points during the gesture, as discussed in more detail below. It should be understood that the gesture utilized herein is not limited to the gesture discussed above and illustrated in FIGS. 13-15, as any gesture, whether user generated or machine generated, that effectuates a difference of signal strength from a BLE unit during movement is applicable to the disclosed systems and methods.

In accordance with embodiments of the present disclosure, signal strengths of the BLE units are recorded during the gesture, and from the trajectory of the gesture and the recorded signal strengths, the disclosed systems and methods derive the distance and direction of all BLE units to the user's device, which are laid out in a 2D spatial map. As discussed in more detail below, this not only produces the spatially accurate 2D setup of the previously unknown BLE units in the space, but also can provide indoor tracking on a decimeter level, which is efficient and increasingly cost effective for device tracking and advertising purposes. In other words, the dynamically constructed 2D map has several advantages for commercial situations, such as, for example, offering coupons when users shop in malls and airports, or providing relevant suggestions to support user experiences in stadiums and sporting events, as discussed in more detail below.

By way of a non-limiting example, according to some embodiments of the present disclosure, a location such as a mall can have a plurality of BLE units installed and located at various positions within the main location. For example, if the mall has a department store and shoe store and a food store, the mall can have 3 or more BLE units situated in the mall associated with the stores. Thus, when a user enters the mall and performs a gesture (such as radially rotating as illustrated in FIGS. 13-15), the disclosed systems and methods can perform an ad-hoc calibration of the BLE units at the mall. That is, the spatial setup of the mall is realized as a 2D map which is instantly constructed with visible identification of the BLE unit's locations in the mall. Therefore, a determination of each stores location through identification of each store's affiliated BLE unit can be realized through the disclosed systems and methods. In other words, the spatial layout of the unknown space in the mall can be determined, whereby identifying the location of each BLE unit, a spatial layout of the mall and the stores within the mall can be determined. Thus, according to some embodiments, relevant advertisements, coupons, or other types of information can be effectively communicated to the user based on the user's determined location with respect to the determined 2D spatial map of the mall. That is, a user's distance to a particular BLE device can be determined, and as a result, relevant information can be provided to the user based on a determined distance to a BLE unit, as discussed in more detail below.

Therefore, in accordance with embodiments of the present disclosure, the disclosed systems and methods utilize detected signals communicated from BLE units in an ad-hoc manner in order to determine the location of the BLE units at a location. Thus, as discussed in more detail below, a signal-strength to distance 2D spatial map is dynamically constructed for use on any device with a Bluetooth™ component.

According to some embodiments, the present disclosure also describes systems and methods for calibrating BLE signal strengths to high-accuracy/precise distances. The present disclosure involves auto-calibrating BLE-based tracking systems, such as, for example, those used increasingly in in-door situations using acoustic signals. The present disclosure enables BLE-based distance estimation to be accurate to decimeters and centimeters, whereas estimates produced by existing systems exhibit an error of several meters—for example, between 2-5 meters. Conventional systems simply categorize distances according to four (4) categories: 1) close, 2) medium far, 3) far away, and 4) no signal; which are absent the ability to accurately and precisely determine distances to decimeters and centimeters.

According to some embodiments, the disclosed systems and methods utilize signals communicated to and from devices in order to determine the distance(s) between the device and installed BLE units at a location. A signal-strength to distance map can then be constructed for reuse on any device with a Bluetooth™ component.

By way of a non-limiting example, according to some embodiments of the present disclosure, a location such a mall can have a plurality of BLE devices (also referred to as BLE units) installed and located at various locations within the main location. For example, if the mall has stores Macys, Footlocker and a food court, the mall can have 3 BLE devices/units situated in the mall respective to the stores. Therefore, a determination of the user's location and/or distance to and from each store can be realized through the disclosed systems and methods. Thus, according to some embodiments, relevant advertisements, coupons, or other types of information can be effectively communicated to the user based on the user's determined location. That is, a user's distance to a particular BLE device can be determined, and as a result, relevant information can be provided to the user based on a determined distance to a BLE unit.

The present disclosure will now be described more fully with reference to the accompanying drawings, in which various embodiments of the disclosure are shown. The disclosure may, however, be embodied in many different forms and should not be construed as being limited to the embodiments set forth herein.

FIG. 1 is a diagram illustrating a BLE communication system according to some embodiments of the present disclosure. Not all the components may be required to practice the disclosure, and variations in the arrangement and type of the components may be made without departing from the spirit or scope of the disclosure. The BLE communication system, according to some embodiments of the present disclosure, may include a mobile device 200 and a BLE device 100. The mobile device 200 may be a terminal for providing a user with a service via BLE communication with the external BLE device 100. For example, the mobile device 200 may register and manage information about the external BLE device 100, for example, Identification (ID) information, in a memory.

As discussed in more detail below with respect to FIGS. 3-8, multiple BLE devices/units 100-100n can be intermittently located around a location 120, thereby, according to Processes 400-700 (and 800), as discussed below, a user's device 200 can communicates with each BLE unit as the user traverses a location 120. For example, BLE devices 100-100n can be located around a shopping mall (i.e., location 120), where each BLE device is associated with a particular restaurant or position within the location, and the user's device (e.g., mobile device) communicates via a BLE connection (e.g., BLE communication 150) with each BLE device according to embodiments of the present disclosure.

The mobile device 200, according to some embodiments, may be implemented in various forms. For example, the mobile device 200 may include virtually any portable computing device capable of connecting to another device and receiving information. Such devices include multi-touch and portable devices such as, but not limited to, cellular phones, smart phones, display pagers, radio frequency (RF) devices, infrared (IR) devices, Personal Digital Assistants (PDAs), handheld computers, laptop computers, wearable computers, tablet computers, navigation devices, e-book terminals, integrated devices combining one or more of the preceding devices, and the like. Mobile devices 100 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 100 may uniquely identify themselves through any of a variety of mechanisms, including a phone number, Mobile Identification Number (MIN), an electronic serial number (ESN), or other mobile device identifier.

The BLE device 100 may communicate identification information via BLE communication 150. As understood by those of skill in the art, BLE communication 150 can be coupled to, or implemented via a wireless network. A Wireless network may include any of a variety of wireless sub-networks that may further overlay stand-alone ad-hoc networks, and the like, to provide an infrastructure-oriented connection for mobile device 200 and BLE device 100. Such sub-networks may include mesh networks, Wireless LAN (WLAN) networks, cellular networks, and the like. Wireless network connectivity for BLE communication 150 may further include an autonomous system of terminals, gateways, routers, and the like connected by wireless radio links, and the like. These connectors may be configured to move freely and randomly and organize themselves arbitrarily, such that the topology of the wireless network may change rapidly. BLE communication 150 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile device 200 with various degrees of mobility. For example, a wireless network BLE communication 150 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, BLE communication 150 may include virtually any wireless communication mechanism by which information may travel between mobile device 200, BLE device 100, and another computing device, network, and the like.

BLE communication 150, as a network, is enabled to employ any form of computer readable media for communicating information from one electronic device to another. For security of the information, such information may be secured by using a known or to be known negotiated encryption key or a pre-defined encryption key. Such encryption may occur at the mobile device 200 and/or at the BLE device 100, or some combination thereof. Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the BLE device 100 may broadcast the identification information in a format of an advertising packet, as discussed in more detail below with respect to FIG. 8. Such communication, or broadcast, can be implemented via BLE communication 150 coupling with an ad server that comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through or at a location(s), and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

According to some embodiments, the BLE device 100 may be implemented in various forms. For example, the BLE device 100 described in the present disclosure may be implemented, via a BLE Device Monitor, in a format of a simple BLE tag, mobile equipment, such as, but not limited to, a BLE phone or a BLE tablet PC, or an accessory, such as, but not limited to, a BLE wristwatch.

Figure 2:
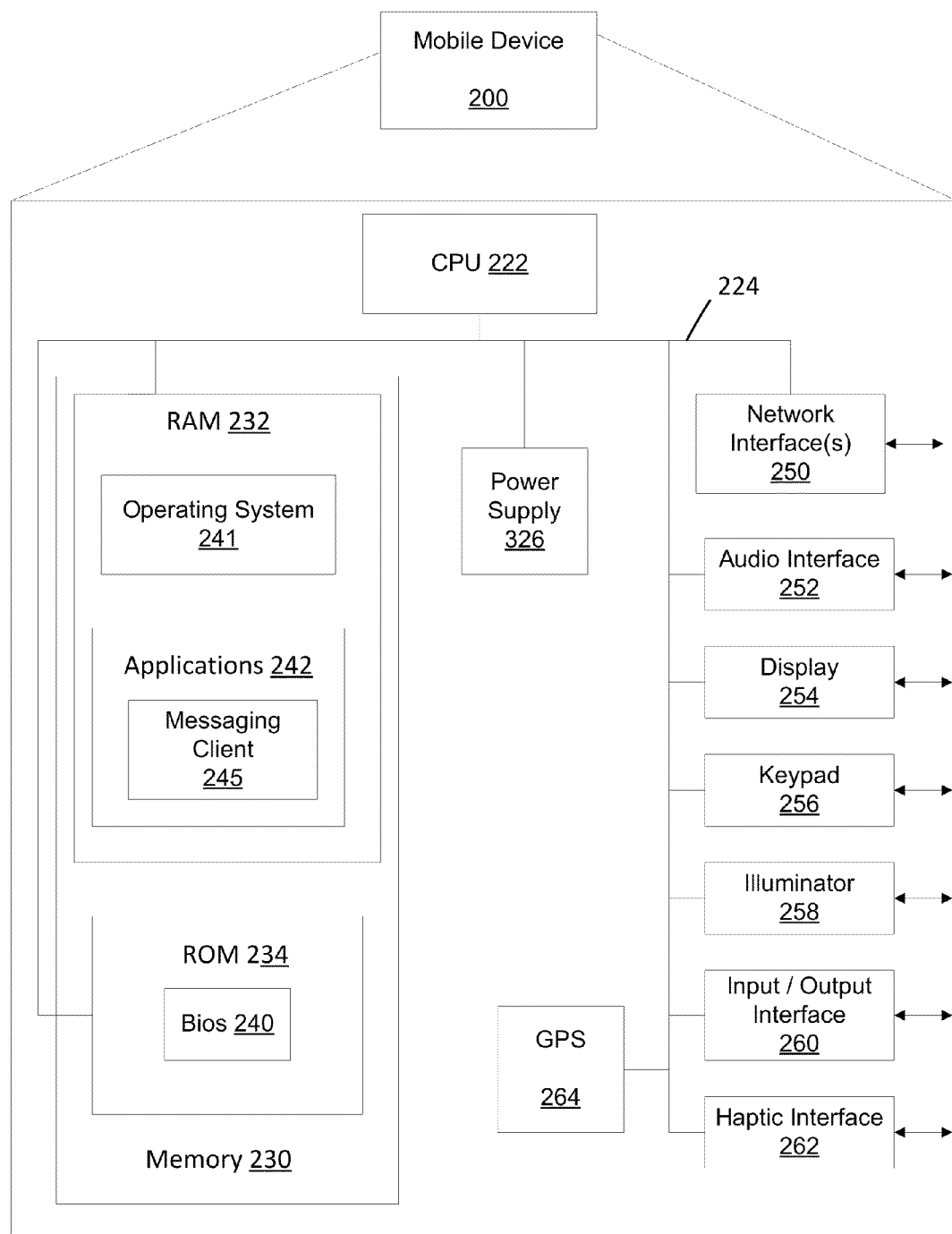
FIG. 2 depicts is a schematic diagram illustrating a client device in accordance with some embodiments of the present disclosure.

FIG. 2 is a schematic diagram illustrating an example embodiment of a client device that may be used within the present disclosure. As discussed above, a client device can be any type of mobile or portable device. For purposes of this disclosure, and for clarity of the following discussion, such devices will be referred to as "mobile devices". It should be understood that a mobile device refers to all types of portable devices that support BLE, as discussed above. Mobile device 200 may include many more or less components than those shown in FIG. 2. However, the components shown are sufficient to disclose an illustrative embodiment for implementing the present disclosure. Thus, mobile device 200 may represent, for example, mobile devices discussed above in relation to FIG. 1.

As shown in FIG. 2, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling Mobile device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the mobile device is powered. Also, illuminator 258 may backlight these buttons in various patterns when particular actions are performed, such as dialing another mobile device. Illuminator 258 may also cause light sources positioned within a transparent or translucent case of the mobile device to illuminate in response to actions.

Mobile device 200 also comprises input/output interface 260 for communicating with external devices, such as a BLE device/unit 100 (from FIG. 1) or a headset, or other input or output devices not shown in FIG. 2. Input/output interface 260 can utilize one or more communication technologies, such as USB, infrared, Bluetooth™, BLE, or the like. Interface 260 may include one or more units for communication between the mobile device 200 and the BLE device 100, or between the mobile device 200 and a server. For example, Interface 260 may include a BLE communication unit, a mobile communication unit, and a broadcasting receiving unit. The BLE communication unit supports a BLE communication function. The BLE communication unit may scan the BLE device 100 for a predetermined period of time or upon a request from a user. The BLE communication unit may involve a sensor hub. As understood by those of skill in the art, the sensor hub is a type of Micro Controller Unit (MCU) and may be connected to various types of sensors. The sensor hub, according to some embodiments can collect information about the external BLE device 100.

The communication unit of interface 260 may also support other short-range wireless communication functions, in addition to the BLE communication function. Short-range wireless technology may include, but is not limited to, a wireless Local Area Network (LAN) which could be a Wi-Fi, Bluetooth, WiFi direct (WFD), Near Field Communication (NFC), Ultra WideBand (UWB), or Infrared Data Association (IrDA) network, as discussed above with respect to BLE communication 150. The mobile communication unit of interface 260 transmits and receives a wireless signal to and from with at least one of a base station, an external terminal, and a server on a mobile communication network. The wireless signals may include, for example, a voice call signal, a video phone call signal or various forms of data used to transmit and receive text or multimedia messages. The broadcasting receiving unit of interface 260 receives broadcasting signals and/or broadcasting-related information from outside, via a broadcasting channel. The broadcasting channel may include, but is not limited to, a satellite channel and a terrestrial broadcast channel.

Haptic interface 262 is arranged to provide tactile feedback to a user of the mobile device. For example, the haptic interface may be employed to vibrate mobile device 200 in a particular way when the Mobile device 200 receives a communication from another user.

Optional GPS transceiver 264 can determine the physical coordinates of Mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Mobile device 200 on the surface of the Earth. It is understood that under different conditions, GPS transceiver 264 can determine a physical location within millimeters for Mobile device 200; and in other cases, the determined physical location may be less precise, such as within a meter or significantly greater distances. In one embodiment, however, Mobile device 200 may through other components, provide other information that may be employed to determine a physical location of the device, including for example, a MAC address, IP address, compass, gyroscope or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Mobile device 200. The mass memory also stores an operating system 241 for controlling the operation of Mobile device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Mobile device 200 to store, among other things, applications 242 and/or other data. For example, data stores may be employed to store information that describes various capabilities of Mobile device 200. The information may then be provided to another device based on any of a variety of events, including being sent as part of a header during a communication, sent upon request, or the like. At least a portion of the capability information may also be stored on a disk drive or other storage medium (not shown) within Mobile device 300.

Applications 242 may include computer executable instructions which, when executed by Mobile device 200, transmit, receive, and/or otherwise process audio, video, images, and enable telecommunication with another user of another mobile device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described with respect to FIGS. 3-16.

Figure 3:
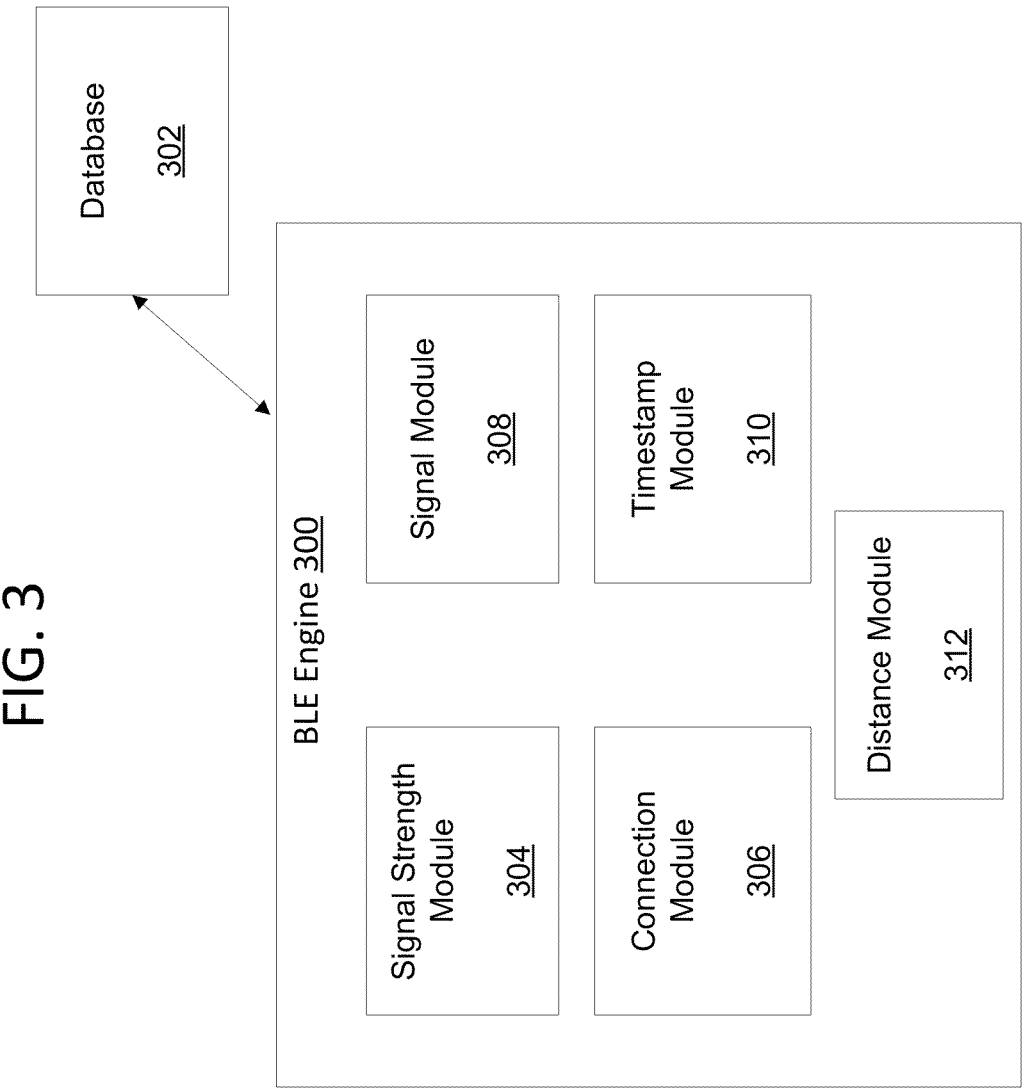
FIG. 3 is a schematic block diagram illustrating components of a system in accordance with embodiments of the present disclosure.

FIG. 3 is a block diagram illustrating the components for performing the systems and methods discussed herein. FIG. 3 includes a BLE engine 300 and an associated database 302 for storing BLE information. The BLE engine 300 could be hosted by a roaming device, BLE device, a server, content provider, an ad server, and the like, or any combination thereof. As discussed in more detail below, the BLE information can be provided to the BLE engine 300 or accessed by a computer program or device that can access the information. Such information, as discussed in more detail below, relates to determined distances associated between roaming devices and BLE devices (or units), a BLE unit's signal strength and the BLE unit's identifier. Indeed, the BLE information can include a type of roaming device, a user associated with the device, proximity data or location data associated with the roaming device and/or BLE device, number of BLE devices within a proximity or associated with a location, among other types of information. In some embodiments, the BLE information can be stored in a lookup table (a data structure in a storage) in database 302, which is associated with a location, coordinates, or, for example, a commercial entity. The database 302 can be any type of database or memory that can store the information mentioned above. The database 302 can be associated with a location, a device (either roaming and/or BLE device) or a network. That is, for example, BLE information associated with a particular location, for example, a mall or stadium, can be stored in a database 302 that is dedicated to such location, as will be evident from the below discussion.

The BLE engine 300 includes a signal strength module 304, a connection module 306, a signal module 308, a timestamp module 310 and a distance module 312. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 4-7, whereby the components of FIG. 3 are implemented to perform the steps and processes of processes 400-700.

Figure 4:
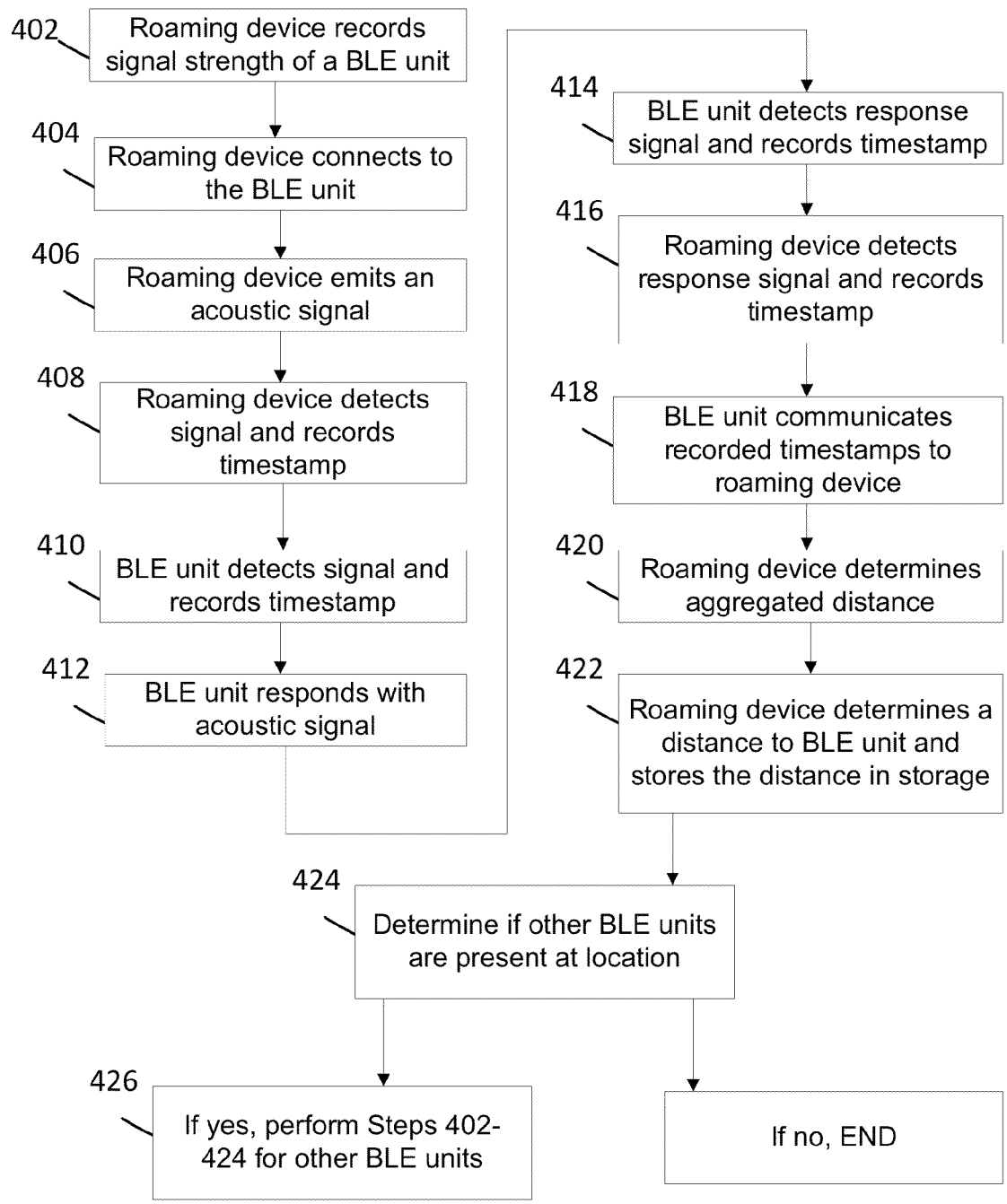
FIG. 4 is a flowchart illustrating steps performed in accordance with some embodiments of the present disclosure.
Figure 5:
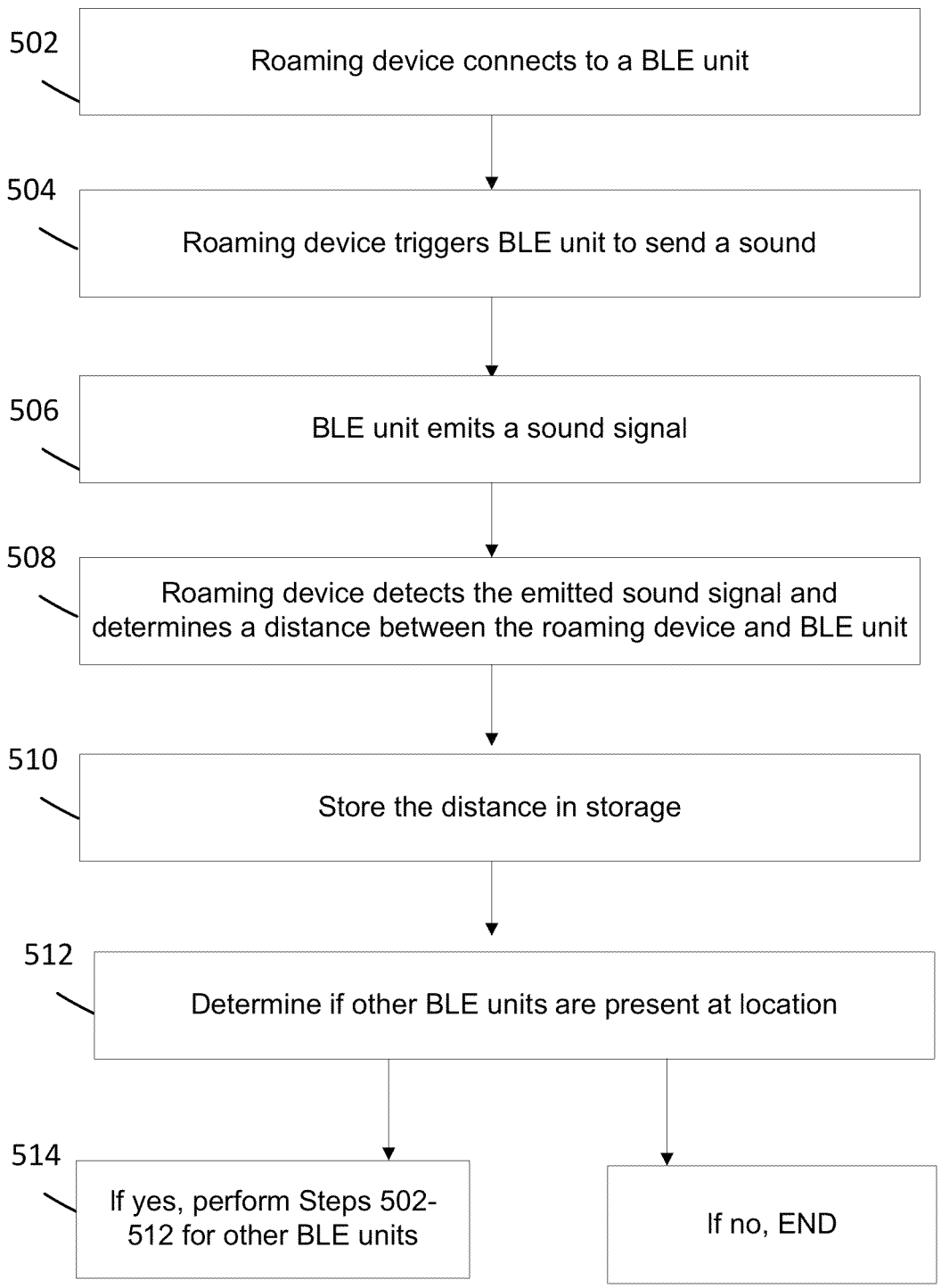
FIG. 5 is a flowchart illustrating steps performed in accordance with some embodiments of the present disclosure.
Figure 6:
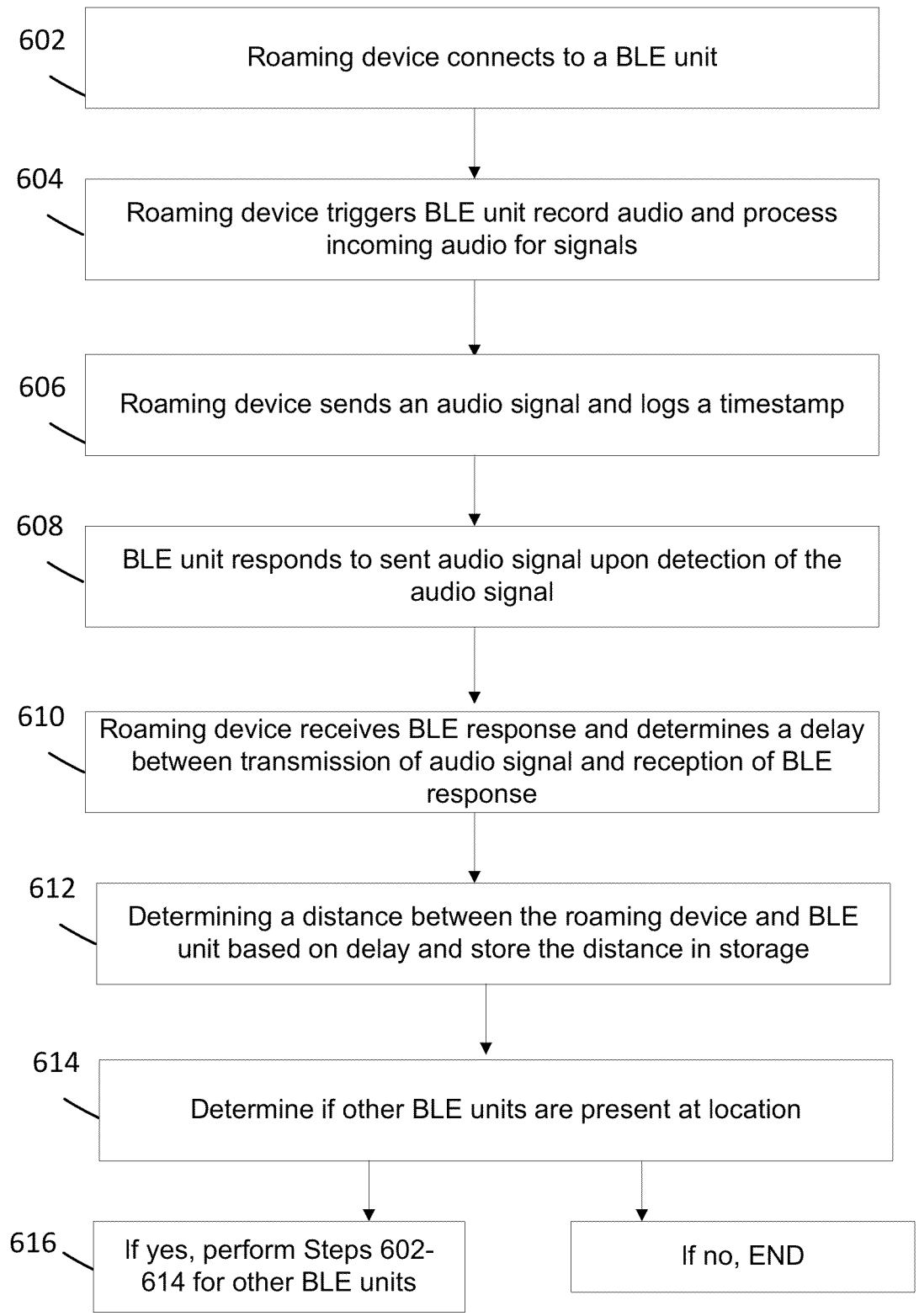
FIG. 6 is a flowchart illustrating steps performed in accordance with some embodiments of the present disclosure.
Figure 7:
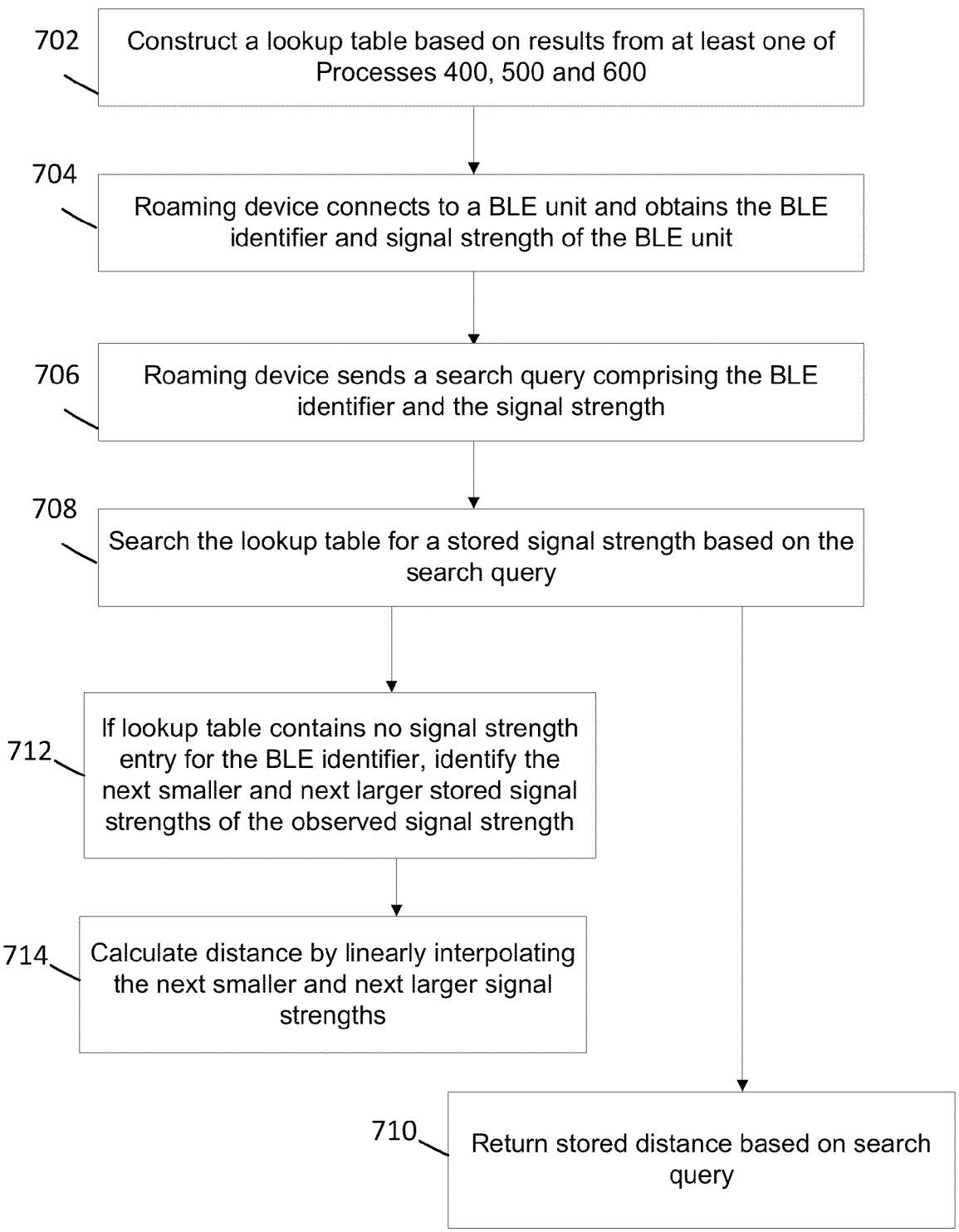
FIG. 7 is a flowchart illustrating steps performed in accordance with some embodiments of the present disclosure.

The present disclosure involves four (4) solutions for calibrating BLE signal strengths to precise distances. All solutions involve a roaming device (the mobile device as discussed above) that incorporates at least one of a microphone, speaker and BLE. FIG. 4 is a process 400 illustrating steps performed in accordance with embodiments of the devices having a microphone, speaker and BLE capabilities. FIG. 5 is a process 500 illustrating steps performed in accordance with embodiments of the devices having a speaker and BLE capabilities. FIG. 6 is a process 600 illustrating steps performed in accordance with embodiments of the devices having a microphone and BLE capabilities. FIG. 7 is a process 700 illustrating steps performed in accordance with embodiments of the devices having only BLE capabilities.

Thus, as shown in FIGS. 4-7, the present disclosure reduces signal strength error to decimeters and centimeters in embodiments of the disclosed BLE-based tracking accuracy systems and methods where all or at least one of a microphone, speaker and BLE capabilities are present. With respect to FIGS. 4-7, as discussed above and understood by those of skill in the art, BLE devices/units can be intermittently located around a location, thereby, according to Processes 400-700 (and 800), as discussed below, a user's roaming device communicates with each BLE unit as the user traverses a location.

Turning to FIG. 4, a process 400 is shown illustrating steps performed in accordance with embodiments of the present disclosure where the devices have a microphone, speaker and BLE. In Step 402, a user roaming device records the signal strength of a BLE unit. That is, the beacons transmitted from the BLE unit are recorded and the strength of such signal is determined from such recording. This is performed by the signal strength module 304. According to some embodiments, the signal strength is determined by performing multiple readings, at least one reading per emitted beacon, and determining the mean of the readings as the recorded signal strength. It should be understood that all known and to be known signal strength reading techniques and algorithms, as well as all known and to be known localization techniques and algorithms using received signal strengths (RSS based localization algorithms and techniques) can be utilized for performing Step 402. In Step 404, the roaming device connects to the BLE unit. This is performed by the connection module 306. As discussed herein with respect to Step 404, and in the below processes of FIGS. 5-7, connecting to the BLE unit involves the roaming device pinging, broadcasting or receiving broadcasts from the BLE unit, directly transmitting to a specific BLE unit, and the like. According to some embodiments, such connections can occur automatically, manually responsive user input, or periodically according to a system set, Bluetooth responsive or user dedicated time period.

After connecting, the roaming device emits an acoustic signal, such as a chirp which may comprise a single frequency, a changing frequency or combination of frequencies (e.g., a DTMF [dual-tone multi-frequency] chirp), and exist in a range below, within or above the range of human hearing. Step 406. In Step 408, the roaming device detects its own acoustic signal and records its local timestamp (referred to as T1). In Step 410, the BLE unit detects the acoustic signal emitted from the roaming device and records its local timestamp at the BLE unit (referred to as T2). In response to Step 410, the BLE unit then plays back an acoustic signal, such as a chirp. Step 412. The BLE unit also detects its own emitted acoustic signal and records its local timestamp (T3). Step 414. In response to the BLE unit's signal emission, the roaming device detects the acoustic signal and records its local timestamp (T4). Step 416. The signal communications of Steps 406-416 are performed by the signal module 308, and the timestamp recordings are performed by the timestamp module 310.

In Step 418, the BLE unit communicates both recorded local timestamps T2 and T3 to the roaming device using Bluetooth™. In response, the roaming device calculates the aggregated distance based on timestamps T1, T2, T3, T4. Step 420. That is, the roaming device calculates the distance between the roaming device's speaker to the BLE unit's microphone, in addition to the distance between the BLE unit's speaker to the roaming device's microphone, from the four timestamps T1, T2, T3, T4. For example, the delay between T1 and T2, and the delay between T3 and T4 are aggregated. According to some embodiments, Step 420 involves determining current conditions at the location, such as but not limited to the current temperature; therefore, a delay time based on T1, T2, T3, T4 can then be multiplied by the speed of sound c in the current conditions. For example, c=(331.3+0.606*v) m/s; v=current temperature. It should be understood that known or to be known acoustic signal detection algorithms can be implemented in the disclosed systems and methods for using sound detection to determine a distance or range or position.

In Step 422, the roaming device divides the aggregated distance from Step 420 by two (2) and stores the result in a lookup table in association with the BLE unit's identifier and signal strength. Steps 420 and 422 are performed by the distance module 312. That is, for the signal strength identified by the roaming device in Step 420, a determined distance to a BLE unit and the BLE's identifier are stored in a lookup table in association with one other. As discussed above, the BLE information includes determined distance, BLE unit identifier and signal strength, which is stored in the lookup table respective to database 302. Therefore, upon searching for a BLE unit's ID, a subsequent device can identify the associated distance with particular signal strength. This provides information relating to the signal strength to distance for a roaming device to a particular BLE unit. According to some embodiments, the storing occurring in Step 422 can also include storing the GPS location of the BLE unit (and/or roaming device) and a time/date of the result in association with the identifier of the BLE unit. Accordingly, recalibration may be required if the BLE unit is moved as the environment of and surrounding the BLE unit can have a strong influence on the signal strength. In Step 424, it is determined if other BLE units are present in or at the location, and if so, the above steps are repeated for the remaining units at the location to determine distances. That is, the roaming device moves through the room, or traverses the location, and repeats this process for varying distances to all BLE units. Step 426. Process 400 results in an accuracy approaching 1-5 centimeters of error for a determined distance or location of a roaming device to a BLE unit.

Turning to FIG. 5, a process 500 is shown illustrating steps performed in accordance with embodiments of the present disclosure where the devices have a speaker and BLE. In Step 502, the roaming device connects to a BLE unit using Bluetooth (via connection module 306). The roaming device then triggers the BLE unit to send (e.g., broadcast) a sound. Step 504. That is, for example, the roaming device communicates a command to the BLE unit for the BLE unit to respond by broadcasting an acoustic sound, such as a chirp. In response to Step 504, the BLE unit emits the sound signal. Step 506. Steps 504-506 are performed by the signal module 308. In Step 508, the roaming device detects the signal and multiplies the delay time between requesting the signal (T1) to receiving the signal (T2) by the speed of sound in the current conditions, where the speed of sound equals: c=(331.3+0.606*v) m/s, v=current temperature. That is, the roaming device determines a time delay—a difference between (T1) requesting the BLE unit to broadcast an acoustic signal and (T2) when the roaming device detects the BLE unit communicated signal. This time delay is then multiplied according to a signal detection algorithm, for example, according to some embodiments: the speed of sound in the current conditions (e.g., speed of sound at the current temperature at the location). This step is performed by the distance module 312. Thus, Step 508 results in a determined location—also referred to as a distance between the roaming device and the BLE unit. In Step 510, the result of Step 508 is stored in a lookup table in association with the BLE unit's identifier; thereby relaying BLE information corresponding to a device strength to distance association. Step 510, in some embodiments, may also store the GPS location of the BLE unit (and/or roaming device) and time/date of the result in association with the BLE unit's identifier, as discussed above.

In Step 512, it is determined if other devices are present at the location, and if so, the roaming device repeats the above steps for all remaining BLE units in the area. Step 514. That is, such determinations and calculations are performed as the roaming device moves through the room and repeats Steps 502-508 for varying distances to all BLE units. Process 500 is based upon the understanding that the travel time of the trigger (the BLE signal communicated in Step 504) is comparably small. That is, the processing time from receiving the command in Step 504 to sending the audio command in Step 506 ultimately produces a distance error of less than 30 centimeters for the roaming device's location. Process 500 enables a determination of the roaming devices distance from a BLE unit up to at most a 30 centimeter area, thereby producing a precise determination of the user's location.

Turning to FIG. 6, a process 600 is shown illustrating steps performed in accordance with embodiments of the present disclosure where the devices have a microphone and BLE. In Step 602, the roaming device connects to a BLE unit using Bluetooth. This step is performed by the connection module 306. The roaming device triggers the BLE unit to start recording audio and process incoming audio for signals. Step 604. That is, the roaming device communicates a command to the connected BLE unit to record audio from surrounding devices within a threshold distance in order to detect incoming audio signals. Step 604, including the command provided by the roaming device and the detection event(s) occurring at the BLE unit, are performed by the signal module 308. Embodiments exist where the audio signals can be in the audible or inaudible spectrum. According to some embodiment, instead of the BLE unit recording signals in response to a command from a roaming device, the BLE unit may continuously, or periodically, record audio to detect incoming signals.

In Step 606, the roaming device sends an audio signal and logs its current audio stamp. That is, Step 606 involves the roaming device communicating an audio signal to the BLE unit, whereby the time of transmission of the signal is recorded. This is performed by the timestamp module 310, and the audio stamp is stored in the database 302. In Step 608, when the BLE unit detects the signal in the audio stream, the BLE unit immediately responds to the roaming device via Bluetooth. Detection of the signal in the audio stream can involve the BLE unit parsing the audio signal to identify the signal. In Step 610, the roaming device receives the response(s) via Bluetooth from the BLE unit, identifies a timestamp for the response(s), and logs the delay. That is, the time delay between the signal transmitted by the roaming device in Step 606 and the signal received from the BLE unit in Step 608 is determined. Step 612 involves translating this delay into a distance by multiplying the delay time by the speed of sound in the current conditions (e.g., temperature): c=(331.3+0.606*v) m/s, v=current temperature. Steps 610 and 612 are performed through a correlation of the timestamp module 310 for determination of the time delay, and the distance module 312 which implements the signal detection algorithm, as discussed above. The result of Step 612 embodies the distance between the roaming device and the BLE unit, which is stored in a lookup table or other data structure in database 302. Additionally, as with Processes 400 and 500, the distance is stored in association with an identifier of the BLE unit. Step 612, in some embodiments, may also store the GPS location of the BLE unit (and/or roaming device) and time/date of the result in association with the BLE unit's identifier, as discussed above. In Step 614, a determination is made regarding whether other BLE units are present at that location, and if so, Step 616 involves repeating Steps 602-614 for the other remaining BLE units.

Process 600 is based upon the understanding that time travel of the roaming device command and signal from Step 602-606, and response of the BLE unit (the BLE signal of Step 608) is small where time of travel for Bluetooth signals equals 300 million m/s. Process 600 enables a determination of the roaming devices distance from a BLE unit up to at most a 50 centimeter area, thereby producing a precise determination of the user's location.

Turning to FIG. 7, a process 700 is shown illustrating steps performed in accordance with embodiments of the present disclosure where the devices have only BLE capabilities. Process 700 involves at least one of the determined BLE information data sets stored in the lookup table from Processes 400-600. That is, as in Step 702, a lookup table is constructed based on results from at least one of the results from Process 400-600. The lookup table contains the following fields: BLE device identifier, signal strength and measured distance. In some embodiments, as discussed above, the lookup table may also contain the GPS location of each BLE unit/device (and/or roaming device for which results were determined) and time/date of the results (from at least one of Processes 400-600), which are associated with the BLE device identifier, as discussed above. In Step 704, a roaming device connects to the BLE unit and obtains the BLE identifier and signal strength of the BLE unit (referred to as an observed signal strength). This information is obtained by the roaming device connecting to the BLE unit and determining the signal strength associated with the BLE unit (as in Steps 402-404 of Process 400 discussed above). In Step 706, the roaming device sends a search query to a server.

According to some embodiments, the server is associated with the location and is correlated with the database 302 storing the lookup table. The query comprises the BLE identifier and the observed signal strength. In response to the query, the server searches the lookup table for the stored signal strength based on the BLE identifier. Step 708. In Step 710, the server returns the stored distance based on the query. In some embodiments, if the lookup table contains no entry of a stored signal strength associated with the observed signal strength for the BLE identifier, the server identifies the next smaller and the next larger signal strengths to the observed signal strength associated with the specific BLE identifier. Step 712. The server then calculates the distance by linearly interpolating these two records. Step 714. Steps 710-714 are performed by the distance module 312. The results of Step 710 or Step 714 are then communicated back to the roaming device.

The accuracy of Process 700 depends on the accuracy of data collected from Processes 400-600. That is, with increasing amounts of data collected from Processes 400-600, the distance accuracy of Process 700 improves. Process 700, which compounds Processes 400-600, produces a substantially higher accuracy tracking system than existing implementations. For example, existing system iBeacon™ produces an error of 1-2 m within 5 m, and an error of at least 3 m at distances greater 5 m; whereas, as discussed above, the disclosed systems and methods produce error distances to precise distances at or below 30-50 centimeters. Processes 400-700 are transferable to other devices rather than just solely attributable to a sole roaming device. Therefore, once a BLE unit has been calibrated (i.e., a distance per signal strength determination), another mobile device may reuse the lookup table (or other data structure) derived from the calibration procedure, as illustrated in Process 700, for example. Thus, the disclosed calibration techniques improve estimating distances and position tracking based on BLE technology regardless a specific device or vendor, or product design or material.

Figure 8:
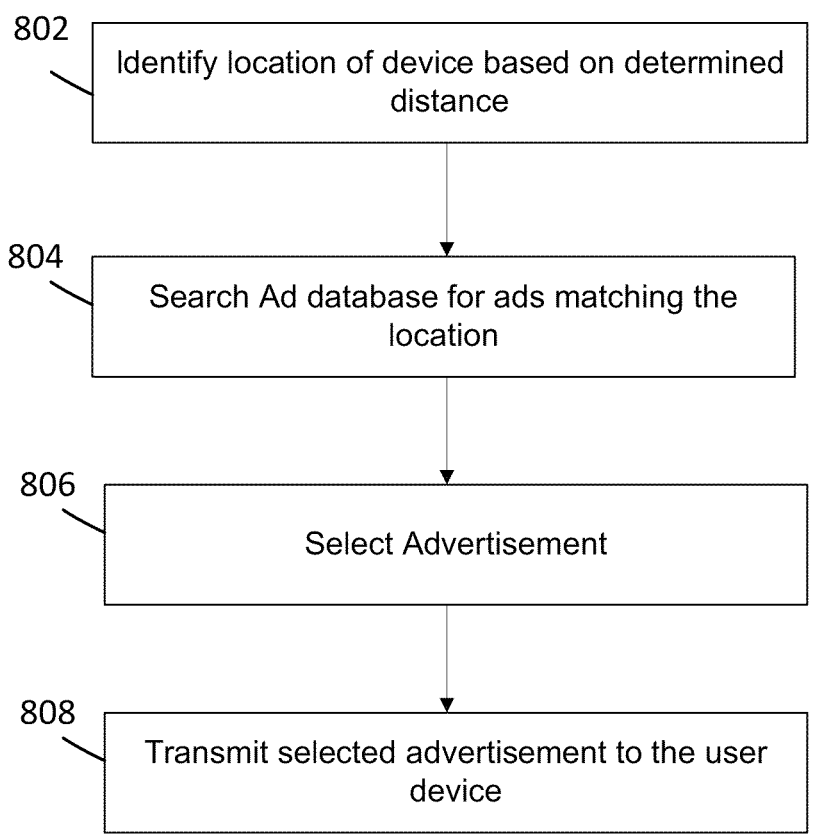
FIG. 8 is a flowchart illustrating steps performed in accordance with some embodiments of the present disclosure.

FIG. 8 is a work flow 800 of serving relevant advertisements based on a calibrated and determined distance from FIGS. 4-7. Specifically, FIG. 8 illustrates example embodiments of how advertisements are served to users of roaming devices based on the calibrated distances to particular BLE devices at or around a location. In Step 802, the determined distance and/or location (referred to as location information) of a user's device is identified. This identification is derived from the distance/BLE information of the user's roaming device from processes 400-700. In Step 804, the location information is communicated (or shared) to an advertisement server. Upon receipt of the location information, the advertisement server performs a search for a relevant advertisement within an associated advertisement database. The search for an advertisement is based at least on the location information.

In Step 804, the advertisement server searches the advertisement database for advertisements that match the identified location. In Step 806, an advertisement is selected (or retrieved) based on the results of Step 804. In some embodiments, the advertisement can be selected based upon the result of Step 804, and modified to conform to attributes of the device upon which the advertisement will be displayed. For example, the ad database contains advertisements for 3 restaurants in a stadium. Based the determined location information of the user, the user is identified to be at or near restaurant X. This determination of the user being near the restaurant can be based upon a threshold, as discussed above, or based upon the user being closer to the BLE unit associated with restaurant X rather than the other restaurants. Therefore, via steps 802-806, an advertisement for restaurant X is identified and selected. In Step 808, the selected advertisement is shared or communicated to the user's device. In some embodiments, the selected advertisement is sent directly to each user's roaming device through applicable communication protocol and/or communication application.

Figure 9:
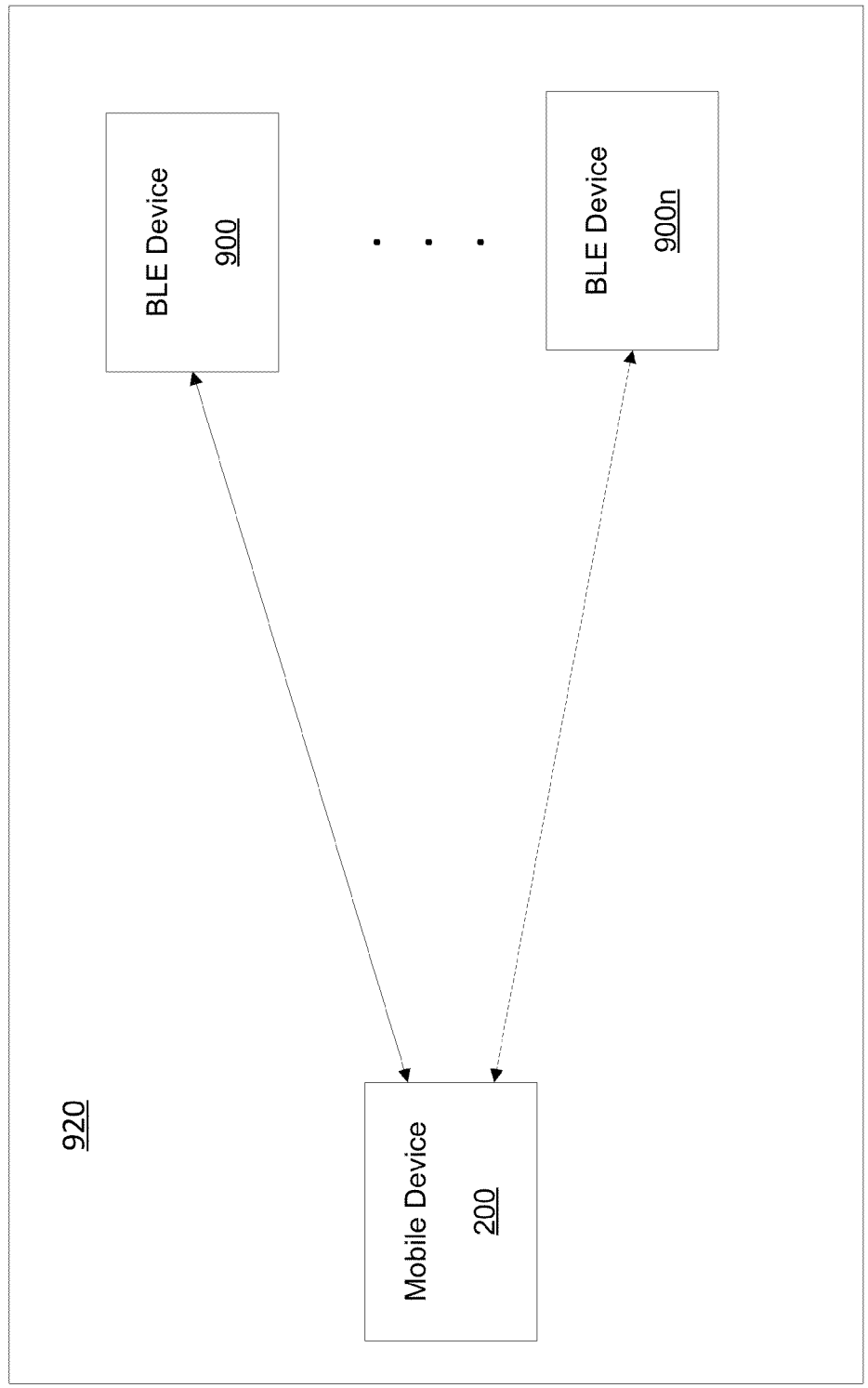
FIG. 9 is a schematic diagram illustrating an example of BLE mapping system according to some embodiments of the present disclosure.

FIG. 9 is a diagram illustrating a BLE mapping system according to some embodiments of the present disclosure. Not all the components may be required to practice the disclosure, and variations in the arrangement and type of the components may be made without departing from the spirit or scope of the disclosure. The BLE mapping system, according to some embodiments of the present disclosure, may include a mobile device 200 and BLE device 900 (up to and including BLE device 900n, which signifies that there can be any number of BLE devices at a location—from 1 to n BLE devices). The mobile device 200 may be a terminal for providing a user with a service via BLE communication 150 with the external BLE device 100. For example, the mobile device 200 may register and manage information about the external BLE device 900, for example, Identification (ID) information, in a memory.

As discussed in more detail below with respect to FIGS. 10-16, multiple BLE devices/units 900-900n can be intermittently located around a location 920, thereby, according to Processes 1100-1200, as discussed below, a user's device 200 can communicate with each BLE unit as the user traverses a location 120, as discussed above. For example, BLE devices 100-100n can be located around a shopping mall (i.e., location 120), where each BLE device is associated with a physical element such as a particular restaurant, store or position within the location, and the user's device (e.g., mobile device) detects signals transmitted or broadcasted by each BLE device 900-900n, according to embodiments of the present disclosure.

According to some embodiments, each BLE device 900-900n may communicate or broadcast information directly for detection by device 200. That is, as discussed in more detail below, a BLE device 900-900n may communicate information associated with identification information, signal-strength information and/or location information for detection by the mobile device 200 during the performance of the gesture. In accordance with embodiments of the present disclosure, such communication detection is a representation of an ad-hoc network. There is, however, no requirement for an exchange of information between the device 200 and the BLE devices 900-900n. In accordance with embodiments of the present disclosure, device 200 simply detects communication signals (e.g., broadcast signals) transmitted from the BLE devices 900-900n. There is no requirement for the mobile device to authenticate, connect or exchange data with the BLE devices. Device 200, through sensors in or on the device, only needs to detect signals output from the BLE devices 900-900n in order to spatially map location 920 by simultaneously deriving the direction and distance of the BLE devices based upon signal strength measurements as discussed further herein. According to some embodiments, detection of the signals communicated or broadcast from BLE devices 900-900n may be detected via BLE communication 150, as discussed above. According to some embodiments, the BLE devices 900-900n may be implemented in various forms as discussed above in FIG. 1.

Figure 10:
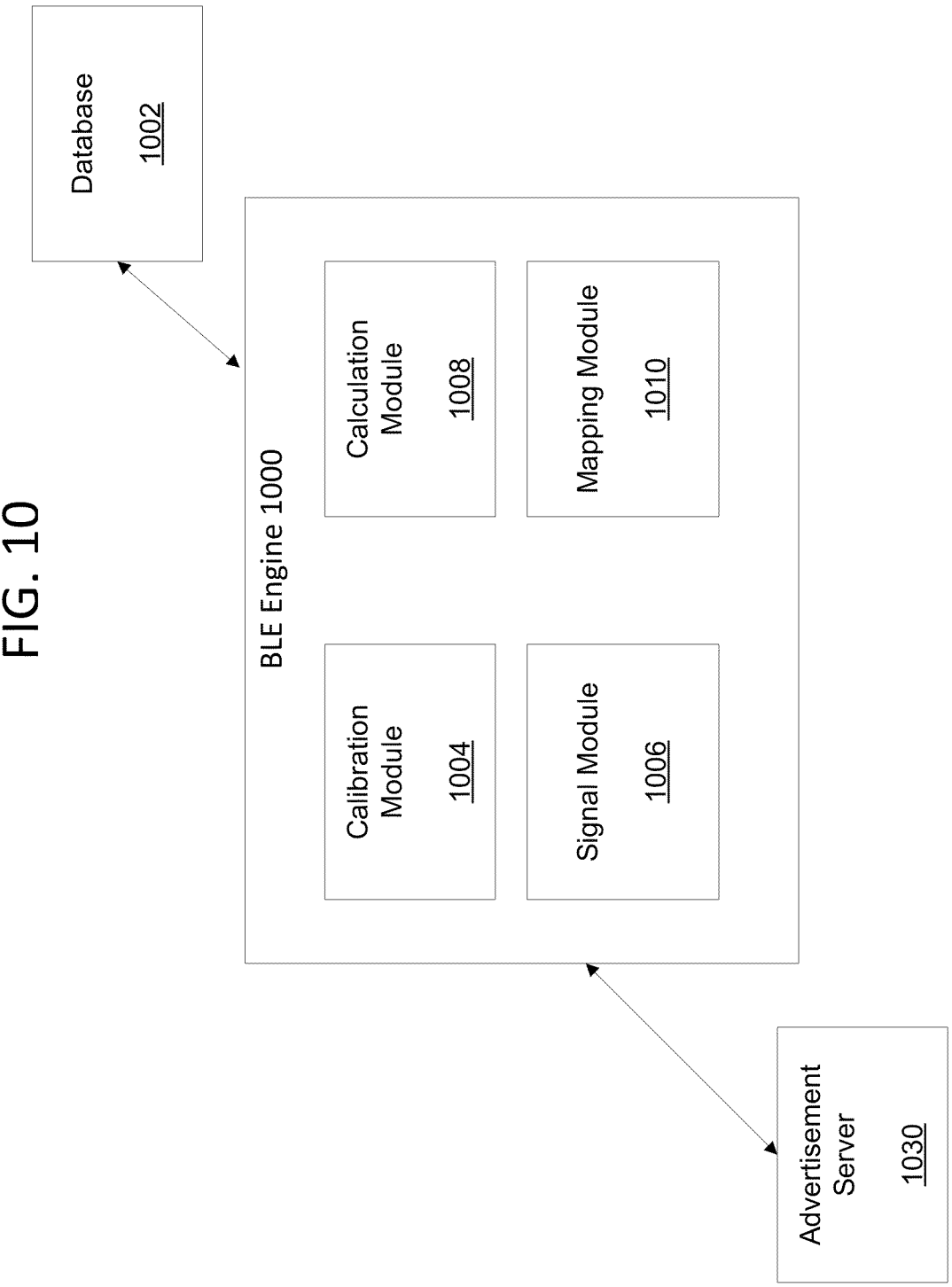
FIG. 10 is a schematic block diagram illustrating components of a system in accordance with embodiments of the present disclosure.

FIG. 10 is a block diagram illustrating the components for performing the systems and methods discussed herein. FIG. 10 includes a BLE engine 1000, an associated database 1002 for storing BLE information and an advertisement ("ad") server 1030. The BLE engine 1000 could be hosted by a mobile device, BLE device, a server, content provider, an ad server, and the like, or any combination thereof. According to embodiments of the present disclosure, the BLE engine 1000 can be implemented via an installed or web-based application that executes on the mobile device 200.

As discussed in more detail below, the BLE information can be detected or provided to the BLE engine 1000 or accessed by a computer program or device that can access the information. Such information, as discussed in more detail below, relates to determined distances associated between mobile devices and BLE devices (or units), distances between each BLE unit, a BLE unit's signal strength and the BLE unit's identifier, rotational angle of the gesture, and the like. Indeed, the BLE information can include a type of mobile device, a user associated with the device, proximity data or location data associated with the mobile device and/or BLE device, number of BLE devices within a proximity or associated with a location, among other types of information. In some embodiments, the BLE information can be stored in a data structure in storage (e.g., a lookup table) in database 1002, which is associated with a location, coordinates, or, for example, a commercial entity. The database 1002 can be any type of database or memory that can store the information mentioned above. The database 1002 can be associated with a location, a device (either mobile and/or BLE unit) or a network. That is, for example, BLE information associated with a particular location, for example, a mall or stadium, can be stored in a database 1002 that is dedicated to such location, as will be evident from the below discussion.

An ad server 1030 comprises a server or ad platform that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Embodiments of implementations of the ad server 1100 in connection with the BLE engine 1000 will be discussed in more detail below.

The BLE engine 1000 includes a calibration module 1004, signal module 1006, calculation module 1008 and a mapping module 1010. It should be understood that the engine(s) and modules discussed herein are non-exhaustive, as additional or fewer engines and/or modules, or sub-engines or modules, may be applicable to the embodiments of the systems and methods discussed. The operations, configurations and functionalities of each module, and their role within embodiments of the present disclosure will be discussed with reference to FIGS. 11-15, whereby the components of FIG. 10 are implemented to perform the steps and processes of Processes 1100-1200.

According to some embodiments, the BLE engine 300 and BLE engine 1000 may be embodied as a single BLE engine containing all or some combination of modules discussed herein.

Figure 11:
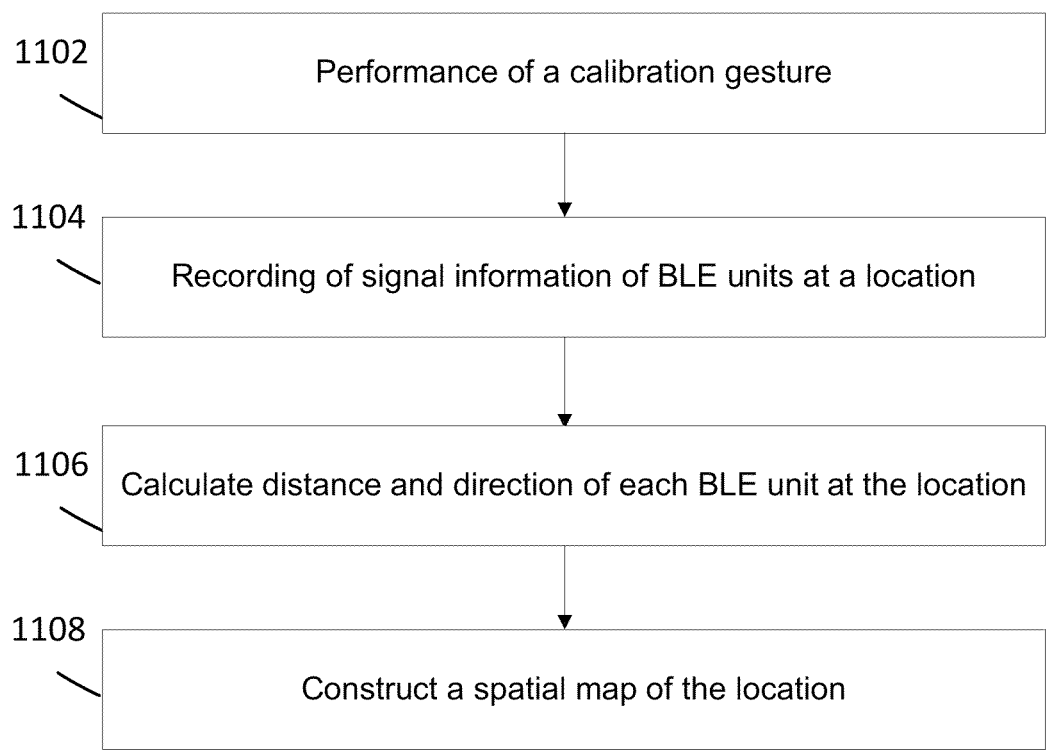
FIG. 11 is a flowchart illustrating steps performed in accordance with some embodiments of the present disclosure.
Figure 12:
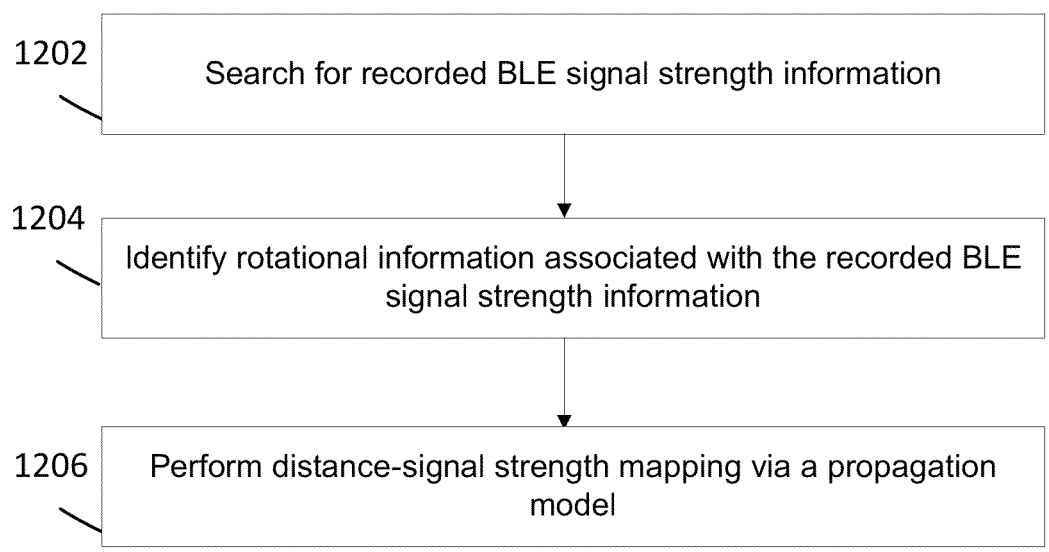
FIG. 12 is a flowchart illustrating steps performed in accordance with some embodiments of the present disclosure.

Turning to FIG. 11, a process 1100 is shown illustrating steps performed in accordance with embodiments of the present disclosure for determining the spatial layout of an indoor tracking system. As discussed above, the present disclosure involves determining a spatial 2D layout of an unknown space in accordance with an absolute orientation. In some embodiments, the orientation is associated with true North-South polar coordinates, whereby after determining the layout of a location, the layout can be applied to known and to be known tracking systems to enable tracking of a user as a user traverses the analyzed location. For example, after determining the spatial layout, as discussed herein, the layout can be applied to a floor-plan of a space, thereby enabling navigation of the space taking into account the intricacies of the location, as discussed in more detail below.

It should be understood that the disclosed systems and methods are not limited to two dimensional layout determinations, as embodiments exist where spatial layouts can be determined in the three-dimensional (3D) space, and even in a space-time space (4D), where a time or day could account for a change in the layout of a space (or location). While conventional approaches are limited to the prior manual determination of a location's layout, the present disclosure overcomes these shortcomings by effectuating a dynamic, ad-hoc determination of BLE device positions which can provide: 1) the spatial layout of the space; 2) the distance between BLE devices at the location; and 3) the distance of each BLE device to a user's mobile device, which in effect, is making the layout determinations discussed herein.

Process 1100 begins with the initiation of the calibration of BLE units in unknown space. Step 1102 involves the initiation of a user commencing a configured calibration gesture. A calibration gesture, referred to as a gesture, can be any movement performed in accordance with a user's device. Gestures, as discussed in more detail below, can involve a user's movement and monitored activity performed by a user's device. Such gestures, in accordance with the disclosed embodiments, are based upon a recognizable radial distance between at least two points of the gesture. The radial distance, or radius of the gesture, must satisfy a distance threshold where a minimum distance and maximum distance associated with the radius can be identified. While there are many types of gestures that can be utilized to map BLE units at or in a location, the present disclosure will be discussed in relation to a turn (or circle or rotational gesture). It should not be construed that the present disclosure is limited to a turn gesture; however, for explanatory purposes, the instant disclosure focuses upon such gesture.

A turn gesture is a circular movement by a user, as illustrated in FIG. 13. FIG. 13 shows a user standing holding a BLE device 200 with an outstretched arm. FIG. 13 illustrates that the user comprises a midline M, a first side S1, for example a right side, and s second side S2, for example a left side. The midline M denotes the absolute vertical center of the user (e.g., person) along a y-axis. Therefore, for example, a turn gesture includes the user spinning around his/her midline M, at a stationary or static position, while holding his/her device 200 at a distance radius R. The length of the user's arm is the radius R of such gesture. According to some embodiments, to normalize results for all users, the length of the user's arm is estimated to be 90 cm (which produces a diameter of the turn gesture of 180 cm). Thus, the radius of a turn gesture would be 90 cm. However, it should be understood that the radius does not need to be tied to the value of 90 cm, as the length of a user's arm can be personalized to a particular user, according to some embodiments. That is, the length or positioning of the arm (i.e., radius of a gesture), can be any distance that satisfies the distance threshold for producing recognizable differences between at least 2 points during a gesture, as discussed above. Indeed, some embodiments exist where gestures can be personalized to account for a user's specific arm length or arm positioning; however, for purposes of this disclosure, and the calculations discussed below, a radius of the discussed gesture will be set at 90 cm.

An example of the turn gesture, as illustrated in FIGS. 13-15, can be the circular movement by a user, where the user extends one arm while holding his/her device and completes one revolution in one direction for a predetermined distance or time. The direction can be clockwise or counter-clockwise. The distance/revolution equates to a 360 degree spin, where the starting position of the movement equates to a reference degree of zero degrees and the final position of the radial spin equates to 360 degrees. Even if the user begins the revolution at the polar coordinate, for example, 90 degrees, this will be viewed as a reference degree of zero degrees for purposes of this disclosure. As discussed above, the turn gesture produces a circle with a radius equivalent to the length of the user's arm, and a diameter equaling to the radius length on both sides (S1 and S2) of the midline M as the user rotates or spins. While the instant disclosure involves a gesture comprising a user spinning around a constant y-axis (in 2D space), it should be understood that other types of gestures are applicable herein, and the disclosed systems and methods should not be limited to the orientation of the user's midline, the reference axis for analyzing the gesture, or the trajectory of the user's gesture.

Therefore, as illustrated in FIG. 13, a user is performing a gesture comprising a spin, or turn of a complete circle: 360 degrees. The starting point of the turn is a reference degree of zero degrees and the finishing point of the complete turn is 360 degrees. According to some embodiments, the turn (or radial spin) gesture illustrated in FIG. 13 must be completed according to a predetermined time period. For example, a complete revolution is to be completed between 5-10 seconds, in order to enable a frame rate sampling of all the BLE units at a location. The radius required for the gesture must at least satisfy a threshold in order to register a spatial difference between the device and the BLE unit during the gesture, as discussed in more detail below and illustrated in FIG. 15. The turn occurs around the constant, static axis associated with the user's midline M, where the radius R of the circle produced from the gesture is the length upon which the user's arm is extended.

Turning back to FIG. 11, Step 1102 involves a user performing the gesture (as illustrated in FIG. 13) at a location (e.g., location 120 from FIG. 1). Recognition and configuration of the gesture is performed by the calibration module 1004. During or throughout the gesture, signal information associated with the BLE units at the location is recorded. Step 1104. That is, while a user performs a gesture, the signal module 1006 identifies broadcasted signals from the BLE units at the location. Upon identifying a signal from a BLE unit, the signal module records the signal strength and beacon identifier for the transmitting BLE unit during the gesture. The signal module 1006 also records the rotational angle of the gesture at which the signal was identified (or detected), which can be derived from the compass or gyroscope operating on the user's device. This information recorded in Step 1104 is stored in a table in storage 1002.

The detection occurring in Step 1104 occurs at a frame rate satisfying a threshold for sampling signal information. The frame rate is at least one frame per a predetermined number or value of degrees moved during a gesture in order to obtain enough coverage of the location during the gesture. It should be understood by those of skill in the art that all known and to be known frame rate sampling techniques can be utilized herein, thereby enabling increased or decreased frame per degree detection. For example, with detection occur every 10 degrees, at each 10 degree interval during the gesture, the signal module 1006 monitors for a BLE signal from a BLE unit at the location. Therefore, from this example, there would be 36 iterations of signal sampling for a given location, which ensures enough coverage of a location.

Utilizing the diagram in FIG. 14 to illustrate the recorded values in Step 1104, FIG. 14 shows reference points A, B, C, D and E. Reference point E will be discussed in more detail below in connection with FIG. 12. Point A references the position of a BLE unit. Point C equates the midline of a user as the user completes the turn gesture signified by item 1402. Item 1402 signifies that the user spins in a 360 degree circle while the user's device 200 is situated at the end of the user's outstretched arm, which has a length of R (radius R, as above) from point C. Points B and D are points along the gesture 1402. Point B is the point of minimum distance of the user's device to the BLE unit. That is, while the user performs the gesture, where the user's arm is extended a distance of R, point B shows the point of minimum distance from the device in the hand at the end of a user's outstretched arm to the BLE unit, point A. Point D is the point of maximum distance of the user device to the BLE unit. That is, while the user performs a turn gesture 1402, and the user's device is at point D, point D is the maximum distance between the user and the BLE unit.

Thus, as discussed in more detail below, at point B, the maximum signal strength could be recorded because the device is closest to the BLE unit (point A) during the gesture. At point D, the minimum signal strength could be recorded because the device is the furthest from the BLE unit during the gesture. According to some embodiments, the minimum strength could also be based upon a factor inhibiting the signal being received by the device, such as, but not limited to, for example, the user's body is in the way and/or is blocking the signal, or some other structure or environmental factor is inhibiting the signal.

Thus, using FIG. 14 as an example, the recorded information discussed in Step 1104 would include the BLE unit identifier, maximum signal strength, minimum signal strength and rotational angles at which the respective signal strengths were detected. Here, the BLE unit identifier would include information associated with the BLE unit at point A. The maximum signal strength would be the signal strength value detected at point B and the minimum signal strength would be the value detected at point D. The rotational angle values would be those rotational values determined by the gyroscope and/or compass of the device 200 performing the gesture at the specific points B through D and back to B to complete a full circle. In some embodiments, the rotational angle values could be determined by a compass application executing on the device 200 and shared, downloaded or uploaded to the BLE application performing the disclosed systems and methods discussed herein. The rotational angle values for points B and D would be at or around 180 degrees apart, with a deviation satisfying a threshold. For example, if rotational value of the maximum value at point B is 270 degrees, then the expected rotational angle value of the minimum value at point D could be 90 degrees. As above, these angle values are respective to the reference degrees (or coordinates), which are generally expressed as polar coordinates. All of these values would be recorded and saved in database 1002, as discussed above in Step 1104.

In Step 1106, recording is stopped upon detection of the gesture being completed. For example, upon the gesture completing its entire 360 degree turn, the signal module 1006 halts monitoring of the location. In Step 1108, the calculation module 1008 calculates the distance and direction of each BLE unit identified at the location. The specifics of the calculations performed in Step 1108 are discussed in more detail below in connection with FIGS. 12, 14 and 15. Steps 1102-1106 can be performed multiple times at different locations within the location 120. Repetition of such steps can, in some embodiments, result in additional BLE units being discovered, as some BLE units may not be within range from the user's initial position.

Then, in Step 1110, a 2D map is realized, where the mapping module 1010 constructs a spatial map of the location based on the distance and direction of each BLE unit. The spatial map of the location provides information relating to the location of each BLE unit at the location as a 2D layout. Embodiments exist where the 2D spatial map constructed in Step 1110 includes only the BLE location information, as determined from Process 1100. Embodiments also exist where the spatial map of Step 1110 can be associated with other mapping information of the location, which can then provide further details about the location. For example, as discussed above, the BLE spatial map of Step 1110 can be overlaid upon a floor plan or map, or electronically combined with a floor plan of the location, where the BLE units are not only identified, but the affiliation with the specifics of the location are revealed. For example, if a BLE unit is identified to be at the North-East corner of the location, correlating this information with a floor plan could reveal that the BLE unit is associated with a specific entity (e.g., store or restaurant) or on a specific floor or room in the location.

Process 1200 illustrates steps performed in accordance with embodiments of the present disclosure for performing the calculations in Step 1108 for determining the layout of an indoor tracking system. Process 1200 is performed by the calculation module 1008. Process 1200 begins after the collection and recording of information occurring in Step 1104. Step 1202 includes searching storage 1002 for the minimum strength and maximum strength values for each detected BLE unit. In Step 1204, the rotational angles for each identified strength value identified in Step 1202 are also identified. In some embodiments, Steps 1202 and 1204 can be performed in a single step, where upon identifying the strength values for a BLE unit, the respective rotational angle values are also identified.

In Step 1206, based on the information collected in Steps 1202-1204, a distance-signal strength map is built using any known or to be known radio propagation model, for example, the log-distance path loss model which predicts the path loss a signal encounters inside a building or densely populated areas over distances. For purposes of this disclosure, the log-distance path loss model will be utilized; however, it should not be construed as limiting, as any known or to be known modeling techniques are applicable.

Step 1206 includes utilizing the received signal strengths (maximum and minimum values), referred to as the received signal strength indication (RSSI), in order to determine the BLE unit's power, environment variables and distance between the user's device and BLE unit. This calculation is illustrated in Equation (1):

$$RSSI = (10*n*\log_{10} D + A), \text{ where:}$$

A=the transmitter power of the BLE unit;

n=a variable characterizing the environment (e.g., temperature at the location); and D=the distance between the user's device and the BLE unit.

Turning back to FIG. 14, for explanation of Step 1206, the values for a specific BLE unit, which were obtained in Steps 1202-1204, are graphed out. As illustrated in diagram 1400, a line connecting points B, C and D is illustrated, which is connected to point A. Line B-D also points to point A, which provides the direction of the BLE unit. That is, point B is the maximum strength value and point D is the minimum value. Therefore, point A is determined to be on the opposite side of the line of point D, with point B being situated between points A and D. The length of the line is associated with or based on the distance calculation. This line is normalized to produce orthogonal line C-E, which shows point E being perpendicular to line B-D, and line C-E having a distance of R. That is, point E is along the gesture path 1402 and is orthogonal to the line connecting the maximum and minimum points B and D. Based on these three points: points B, D and E, we derive the following equations:

For point $B$: RSSI=$(10*n*\log_{10}(D-0.9)+A)$   Equation (2):

For point $D$: RSSI=$(10*n*\log_{10}(D-0.9)+A)$   Equation (3):

For point $E$: RSSI=$(10*n*\log_{10}\sqrt{(D^2-0.9^2)}+A)$   Equation (4):

Equations (2-4) each feature three unknowns: A, n and D, as discussed above. For each equation (and point), each unknown is solved for, which provides the accurate distance of the BLE unit. Note, the value 0.9 is the value radius R, and as discussed above, this is not a static value as it can be altered or modified to conform to a specific gesture or characteristics of a user performing a gesture, in accordance with some embodiments. Thus, as discussed above, the value of radius R may change based on specific characteristics of a user (e.g., a user's height and/or arm length) or values entered by a user signifying a specific gesture being performed, and the like. Therefore, after this information is determined in Step 1206 as discussed herein, the determined distance and direction of each BLE unit with respect to the user's device is mapped out as in Step 1110.

According to some embodiments, Step 1206 can be performed via implementation of known or to be known data fitting techniques/algorithms, such as, but not limited to, the least squares statistical regression analysis. Such implementations can be performed on all sampling points determined during a gesture. Thus, according to some embodiments, a direction can be determined via, for example, the least squares algorithm, whereby Step 1206 solves the applicable equations for (D, A, n). As such, according to some embodiments, a curve fitting algorithm, for example, can be applied to determine the final (D, A, n) that equates to the best fit for all data points as discussed above.

FIG. 15 illustrates an example top-down view at a location 1500 for BLE mapping in accordance with some embodiments of the present disclosure, implementing Processes 1100 and 1200 as discussed above. FIG. 15 shows a user U performing a turn gesture 1402 with his/her device 200 outstretched a distance of R (e.g., 0.9 cm), as discussed above. It should be understood that point U signifies the midline (or midpoint for this top-down view) of the user as he/she rotates 360 degrees. As illustrated, there are three BLE units: B1, B2 and B3 at a location. As the user performs and completes the turn gesture the full 360 degrees, and each BLE unit is detected, each BLE unit's maximum and minimum strength values, and associated rotational values are recorded (as discussed above in Process 1100). These values are then retrieved and used to calculate the direction and distance of each BLE unit. As discussed above, the location of each BLE unit is unknown, therefore, based on the calculations being performed, as discussed in relation to Process 1200 and Step 1108, a spatial mapping of the unknown location can be realized.

For BLE unit B1: the maximum strength value is illustrated at point B1(rot_max), where "rot_max" signifies the rotational value at the maximum strength position along the gesture. The minimum strength value is illustrated at point B2(rot_min), where "rot_min" signifies the rotational value at the minimum strength position along the gesture. As discussed above, the strength values: rot_max and rot_min have a 180 rotational degrees differential. For BLE units B2 and B3, a similar designation follows. That is, for BLE unit B2, the maximum strength value is illustrated at point B2(rot_max) and a minimum strength value at B2(rot_min). For BLE unit B3, the maximum strength value is illustrated at point B3(rot_max) and a minimum strength value at B3(rot_min). Therefore, for each BLE unit B1, B2 and B3, the above calculations in Step 1206 are performed.

For example, for BLE unit B1, the calculations of Step 1206 are as follows:

For point B1(rot_max): RSSI=$(10*n*\log_{10}(D-0.9)+A)$
For point B1(rot_min): RSSI=$(10*n*\log_{10}(D-0.9)+A)$
For point B1(E): RSSI=$(10*n*\log_{10}\sqrt{(D^2-0.9^2)}+A)$, where point B1(E) is derived in the similar manner as "point E" above, discussed in relation to FIG. 14.

Therefore, the mapping of the location of BLE unit B1 involves the solving for the unknowns A, n and D. Additionally, the line from B1(rot_min) to B1(rot_max) shows that the direction of the B1 unit is on the opposite side of the line from B1(rot_min), with the point for B1(rot_max) situated between these two locations along such line. Thus, such derivations provide the distance from the user's device to the B1 unit, and the direction in accordance with polar coordinates providing an absolute orientation (e.g., a North-South orientation).

For BLE unit B2, the calculations of Step 1206 are as follows:

For point B2(rot_max): RSSI=$(10*n*\log_{10}(D-0.9)+A)$
For point B2(rot_min): RSSI=$(10*n*\log_{10}(D-0.9)+A)$
For point B2(E): RSSI=$(10*n*\log_{10}\sqrt{(D^2-0.9^2)}+A)$, where point B2(E) is derived in the similar manner as "point E" above, discussed in relation to FIG. 14.

Therefore, the mapping of the location of BLE unit B2 involves the solving for the unknowns A, n and D. The direction of the B2 BLE unit is determined in the same manner as the B1 unit. Specifically, a line is drawn connecting the points for B2(rot_min) and B2(rot_max), where the line begins with B2(rot_min), and has B2(rot_max) between the B2(rot_min) point and the location of the B2 unit location, where the length of the line is associated with the determined distance from the above equations. Thus, such derivations provide the distance from the user's device to the B2 unit, and the direction in accordance with polar coordinates providing an absolute orientation.

For BLE unit B3, the calculations of Step 1206 are as follows:

For point B3(rot_max): RSSI=$(10*n*\log_{10}(D-0.9)+A)$
For point B3(rot_min): RSSI=$(10*n*\log_{10}(D-0.9)+A)$
For point B3(E): RSSI=$(10*n*\log_{10}\sqrt{(D^2-0.9^2)}+A)$, where point B3(E) is derived in the similar manner as "point E" above, discussed in relation to FIG. 14.

Therefore, the mapping of the location of BLE unit B3 involves the solving for the unknowns A, n and D, and the direction of the B3 unit, in a similar manner as discussed above. This provides the distance from the user's device to the B3 unit, and the direction in accordance with polar coordinates providing an absolute orientation.

Figure 16:
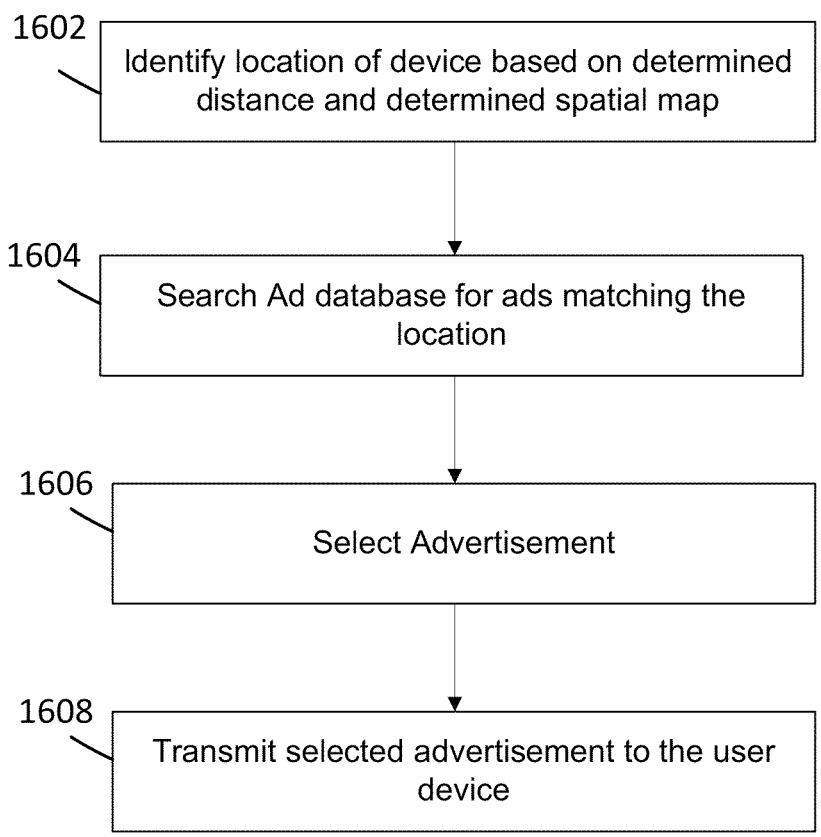
FIG. 16 is a flowchart illustrating steps performed in accordance with some embodiments of the present disclosure.

FIG. 16 illustrates embodiments for a process 1600 for serving relevant advertisements to a user's device based on a calibrated and determined distance and direction between the user's device and the discovered BLE units at a location, as discussed above in relation to FIGS. 11-15.

Specifically, FIG. 16 illustrates example embodiments of how advertisements are served to users of mobile devices based on the BLE mapping, as discussed above in connection with FIGS. 9-15, and based on a calibrated and determined distance from the discussion of FIGS. 4-7. That is, after determining the mapped layout of a previously unknown space, each discovered BLE unit at the space (or location) is now located. Therefore, a user's actions and activity can be tracked and relevant information can be provided to the user with respect to his/her position at the location. For example, after determining the spatial layout, as discussed above, the 2D spatial mapping can be applied to a floor-plan of a space, thereby enabling navigation of the space taking into account the intricacies of the location.

By way of a non-limiting example, a store has 2 BLE units affixed to two product sections, one unit in Row 1 of the store associated with product X and another in Row 2 associated with product Y. After performing the spatial analysis of the BLE mapping methods and systems discussed above, the location of each BLE unit is identified.

The steps performed in Process 1600 can be utilized in accordance with the correlation of the 2D spatial map and a floor-plan of the store, or without such correlation. That is, embodiments exist where a user's actions and location can be tracked by applying the BLE map to a structural layout of the store (e.g., a floor plan, schematic or architectural diagrams). For example, the determined BLE map, as discussed above, can be applied to the store's floor plan layout. Application of the BLE map to the floor plan can be in accordance with the absolute orientation, where the floor plan is situated according to a North-South designation in order to coincide with the navigational coordinates of the constructed BLE map. In some embodiments, as discussed above, the orientation of the BLE map is associated with true North-South polar coordinates, whereby after determining the layout of a location, the spatial mapping can be applied to known and to be known tracking systems to enable tracking of a user as a user traverses the analyzed location. In some embodiments, the BLE map may be formatted to coincide with the directional coordinates in the structural (floor plan) layout. The application of the BLE map to the floor plan of the store can occur on the user's device which is implementing the BLE mapping system, where the BLE mapping system (e.g., BLE engine) has capabilities to upload, download and/or view other mapping information in order to integrate the constructed BLE map information.

In some other embodiments, Process 1600 need only know the location of a user with respect to a BLE unit, as the closest BLE unit the user will trigger the following steps of Process 1600. Therefore, it may not be necessary in some embodiments to integrate a BLE map with a structural layout of a particular location.

Turning back to the above example, now that the BLE unit locations are determined at the store, embodiments exist where the 2D spatial mapping of the store can be applied to the stores layout, e.g., floor plan. Therefore, through the application on the user's device performing Processes 1100-1200 and implementing the BLE engine 1000, the BLE map constructed for the store can be integrated or laid upon the floor plan of the store. Thus, the details and layout of the store can provide further information to the BLE map. In some embodiments, the integration of the store's layout can include augmenting the BLE map so that the structural or design information of the store is added to the BLE map. For example, such integration can show that the BLE unit associated with product X is situated in Row 1 of the store, whereas prior to such integration, the BLE unit may have simply been shown to be located in, for example, the North-West corner of the store, 30 meters from the user at a degree of 330 degrees.

In some embodiments, as discussed above, integration may not be required, as the coordinates, distance and direction of the BLE units at the location to the user may be utilized to locate the BLE unit closest to the user. That is, it may not be needed to know the structural or design layout of the store, as the BLE map can be all that is required to determine which unit is closest to the user, as evident from the below discussion.

Therefore, given either embodiment of integration of the BLE mapping or the BLE map as a stand-alone map, Step 1602 involves determining location information associated with a user's device at a location. As above, the location can be determined respective an integrated BLE map or a stand-alone BLE map. Step 1602 also involves determining a distance of a user's device to a BLE unit at the location based on location information of the BLE unit(s) and user's device.

Thus, Step 1602, as with either embodiment, involves determining a user's location based, at least in part, on the BLE map, and identifying which BLE unit at a location is closest to the determined user's location based on the calibrated distances to particular BLE devices at or around a location, as discussed above in connection with FIGS. 4-8. According to some embodiments, a user's location may also be determined based on other known and to be known location techniques for identifying a user's location with respect to at least one BLE device.

In Step 1604, the location information (e.g., closest BLE unit to the user's location) is communicated (or shared) to an advertisement server. Upon receipt of the location information, the advertisement server 1030 performs a search for a relevant advertisement within an associated advertisement database. The search for an advertisement is based at least on the location information. In Step 1604, the advertisement server searches the advertisement database for advertisements that match the identified location. In Step 1606, an advertisement is selected (or retrieved) based on the results of Step 1604. In some embodiments, the advertisement can be selected based upon the result of Step 1604, and modified to conform to attributes of the device upon which the advertisement will be displayed.

For example, the ad database contains advertisements for 3 restaurants in a stadium. Based the spatial mapping analysis discussed herein and the determined location information of the user, the user is identified to be at or near restaurant X. This determination of the user being near the restaurant can be based upon the user being closer to the BLE unit associated with restaurant X rather than the other restaurants. Therefore, via steps 1602-1606, an advertisement for restaurant X is identified and selected. In Step 1608, the selected advertisement is shared or communicated to the user's device. In some embodiments, the selected advertisement is sent directly to each user's mobile device through applicable communication protocol and/or communication application.

As shown in FIG. 17, internal architecture 1700 includes one or more processing units, processors, or processing cores, (also referred to herein as CPUs) 1712, which interface with at least one computer bus 1702. Also interfacing with computer bus 1702 are computer-readable medium, or media, 1706, network interface 1714, memory 1704, e.g., random access memory (RAM), run-time transient memory, read only memory (ROM), media disk drive interface 1720 as an interface for a drive that can read and/or write to media including removable media such as floppy, CD-ROM, DVD, media, display interface 1710 as interface for a monitor or other display device, keyboard interface 1716 as interface for a keyboard, pointing device interface 1718 as an interface for a mouse or other pointing device, and miscellaneous other interfaces not shown individually, such as parallel and serial port interfaces and a universal serial bus (USB) interface.

Memory 1704 interfaces with computer bus 1702 so as to provide information stored in memory 1704 to CPU 1712 during execution of software programs such as an operating system, application programs, device drivers, and software modules that comprise program code, and/or computer executable process steps, incorporating functionality described herein, e.g., one or more of process flows described herein. CPU 1712 first loads computer executable process steps from storage, e.g., memory 1704, computer readable storage medium/media 1706, removable media drive, and/or other storage device. CPU 1712 can then execute the stored process steps in order to execute the loaded computer-executable process steps. Stored data, e.g., data stored by a storage device, can be accessed by CPU 1712 during the execution of computer-executable process steps.

Persistent storage, e.g., medium/media 1706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1728 typically provides information communication using transmission media through one or more networks to other devices that use or process the information. For example, network link 1728 may provide a connection through local network 1724 to a host computer 1726 or to equipment operated by a Network or Internet Service Provider (ISP) 1730. ISP equipment in turn provides data communication services through the public, worldwide packet-switching communication network of networks now commonly referred to as the Internet 1732.

A computer called a server host 1734 connected to the Internet 1732 hosts a process that provides a service in response to information received over the Internet 1732. For example, server host 1734 hosts a process that provides information representing video data for presentation at display 1710. It is contemplated that the components of system 1700 can be deployed in various configurations within other computer systems, e.g., host and server.

At least some embodiments of the present disclosure are related to the use of computer system 1700 for implementing some or all of the techniques described herein. According to one embodiment, those techniques are performed by computer system 1700 in response to processing unit 1712 executing one or more sequences of one or more processor instructions contained in memory 1704. Such instructions, also called computer instructions, software and program code, may be read into memory 1704 from another computer-readable medium 1706 such as storage device or network link. Execution of the sequences of instructions contained in memory 1704 causes processing unit 1712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1700. Computer system 1700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1702 as it is received, or may be stored in memory 1704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
   monitoring, via a computing device, a location for signals associated with at least one Bluetooth low energy (BLE)

unit, said monitoring occurring during performance of a preconfigured gesture that changes the position of the computing device during the performance of the gesture, said location comprising an unknown number of BLE units and BLE unit positions at said location;

detecting, via the computing device and during performance of the gesture, a signal from a first BLE unit, said detection occurring ad-hoc without exchanging information with said BLE unit;

based on said detection, determining, via the computing device, signal information associated with said signal;

calculating, via the computing device, a distance to and direction of said first BLE unit respective to the computing device based on said signal information; and visibly displaying, on a display associated with said computing device, a spatial map of said location, said spatial map comprising an indication of a position of the first BLE unit based on the calculated distance and direction.

2. The method of claim 1, wherein said preconfigured gesture comprises said computing device being moved for 360 degrees along a radial trajectory about an axis with a preset radius from said axis.

3. The method of claim 1, wherein said monitoring occurs at a predetermined frame sampling rate.

4. The method of claim 1, further comprising recording said signal information in a database associated with said computing device.

5. The method of claim 1, wherein said signal information comprises a maximum signal strength of said signal at a first point along said trajectory and a minimum signal strength of said signal at a second point along said trajectory, said maximum signal strength associated with a rotational angle of said gesture at said first point, said minimum signal strength associated with a separate rotational angle of said gesture at said second point.

6. The method of claim 5, further comprising:
determining a third point along said gesture's trajectory, said third point being at a point along said gesture trajectory that is orthogonal to a line connecting said first point and said second point.

7. The method of claim 6, wherein said calculation comprises applying a radio propagation model to said signal information, wherein said calculation is performed in accordance with said first, second and third points.

8. The method of claim 6, wherein said calculation comprises utilizing said signal information to solve for variables n, D and A for said first and second points in equation: received signal strength indicator (RSSI)=$(10*n*\log_{10} D+A)$, wherein A equals a transmitter power of the first BLE unit,
wherein n equals an environmental variable at said location, and
wherein D equals a distance between the computing device and the first BLE unit.

9. The method of claim 8, wherein said RSSI is associated with a value of the maximum signal strength and a value of the minimum signal strength.

10. The method of claim 8, wherein said calculation further comprises utilizing said signal information to solve for variables n, D and A for said third point in equation: RSSI= $(10*n*\log_{10} \sqrt{(D^2-R^2)}+A)$, wherein calculation of the n, D and A variables for the first, second and third point produces the distance of the first BLE unit, wherein R denotes a radius of said gesture.

11. The method of claim 5, wherein the rotational angle of the maximum signal strength and the rotational angle of the minimum signal strength are 180 degrees apart.

12. The method of claim 10, wherein said direction of the first BLE unit is based on the rotational angles of the maximum and minimum signal strength, wherein the first BLE unit is determined to be located on a line opposite the second point with the first point being situated between the second and third points on the line.

13. The method of claim 1, wherein said computing device is a mobile device.

14. The method of claim 1, further comprising:
determining a position of said computing device based on said spatial map;
causing a search of an advertisement platform for an advertisement based on said position, said advertisement associated with an entity at said location, said entity associated with the first BLE unit;
causing a selection of said advertisement; and
displaying said advertisement on the display of said computing device.

15. A non-transitory computer-readable storage medium tangibly encoded with computer-executable instructions, that when executed by a processor associated with a computing device, performs a method comprising:
monitoring a location for signals associated with at least one Bluetooth low energy (BLE) unit, said monitoring occurring during performance of a preconfigured gesture that changes the position of the computing device during the performance of the gesture, said location comprising an unknown number of BLE units and BLE unit positions at said location;
detecting, during performance of the gesture, a signal from a first BLE unit, said detection occurring ad-hoc without exchanging information with said BLE unit;
based on said detection, determining signal information associated with said signal;
calculating a distance to and direction of said first BLE unit respective to the computing device based on said signal information; and
visibly displaying, on a display associated with said computing device, a spatial map of said location, said spatial map comprising an indication of a position of the first BLE unit based on the calculated distance and direction.

16. The non-transitory computer-readable storage medium of claim 15, wherein said signal information comprises a maximum signal strength of said signal at a first point along said trajectory and a minimum signal strength of said signal at a second point along said trajectory, said maximum signal strength associated with a rotational angle of said gesture at said first point, said minimum signal strength associated with a separate rotational angle of said gesture at said second point.

17. The non-transitory computer-readable storage medium of claim 16, further comprising:
determining a third point along said gesture's trajectory, said third point being at a point along said gesture trajectory that is orthogonal to a line connecting said first point and said second point.

18. The non-transitory computer-readable storage medium of claim 17,
wherein said calculation comprises utilizing said signal information to solve for variables n, D and A for said first and second points in equation: received signal strength indicator (RSSI)=$(10*n*\log_{10} D+A)$,
wherein A equals a transmitter power of the first BLE unit,
wherein n equals an environmental variable at said location, and
wherein D equals a distance between the computing device and the first BLE unit;

wherein said calculation further comprises utilizing said signal information to solve for variables n, D and A for said third point in equation:

$RSSI = (10*n*\log_{10}\sqrt{(D^2-R^2)}+A)$; and wherein calculation of the n, D and A variables for the first, second and third point produces the distance of the first BLE unit, wherein R denotes a radius of said gesture.

19. The non-transitory computer-readable storage medium of claim 16, wherein said direction of the first BLE unit is based on the rotational angles of the maximum and minimum signal strength, wherein the first BLE unit is determined to be located on a line opposite the second point with the first point being situated between the second and third points on the line.

20. A system comprising:
a computing device comprising:
memory storing computer-executable instructions; and
one or more processors for executing said computer-executable instructions for:
monitoring a location for signals associated with at least one Bluetooth low energy (BLE) unit, said monitoring occurring during performance of a preconfigured gesture that changes the position of the computing device during the performance of the gesture, said location comprising an unknown number of BLE units and BLE unit positions at said location;
detecting, during performance of the gesture, a signal from a first BLE unit, said detection occurring ad-hoc without exchanging information with said BLE unit;
based on said detection, determining signal information associated with said signal;
calculating a distance to and direction of said first BLE unit respective to the computing device based on said signal information; and
visibly displaying, on a display associated with said computing device, a spatial map of said location, said spatial map comprising an indication of a position of the first BLE unit based on the calculated distance and direction.

* * * * *